(12) United States Patent
Fukuda et al.

(10) Patent No.: US 10,343,509 B2
(45) Date of Patent: Jul. 9, 2019

(54) DEVICE FOR CONTROLLING DRIVING FORCE OF HYBRID VEHICLE

(71) Applicant: Nissan Motor Co., Ltd., Yokohama-shi, Kanagawa (JP)

(72) Inventors: Hiroyuki Fukuda, Kanagawa (JP); Tomoyuki Nakano, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/739,816

(22) PCT Filed: Jul. 7, 2015

(86) PCT No.: PCT/JP2015/069562
§ 371 (c)(1),
(2) Date: Dec. 26, 2017

(87) PCT Pub. No.: WO2017/006440
PCT Pub. Date: Jan. 12, 2017

(65) Prior Publication Data
US 2018/0186230 A1 Jul. 5, 2018

(51) Int. Cl.
*B60W 20/40* (2016.01)
*B60K 6/547* (2007.10)
(Continued)

(52) U.S. Cl.
CPC ......... *B60K 6/547* (2013.01); *B60K 1/02* (2013.01); *B60K 6/387* (2013.01); *B60K 6/442* (2013.01); *B60W 10/06* (2013.01); *B60W 10/08* (2013.01); *B60W 10/11* (2013.01); *B60W 20/15* (2016.01); *B60W 20/40* (2013.01); *B60L 2240/12* (2013.01); *B60L 2240/423* (2013.01);
(Continued)

(58) Field of Classification Search
CPC ...... B60W 20/40; B60W 20/10; B60W 20/13; B60W 20/15
See application file for complete search history.

(56) References Cited

U.S. PATENT DOCUMENTS

| 2003/0001390 A1 | 1/2003 | Phillips et al. |
| 2004/0134698 A1 | 7/2004 | Yamamoto et al. |

(Continued)

FOREIGN PATENT DOCUMENTS

| JP | 10-325345 A | 12/1998 |
| JP | 2010-76680 A | 4/2010 |

(Continued)

*Primary Examiner* — Erin D Bishop
(74) *Attorney, Agent, or Firm* — Global IP Counselors, LLP

(57) ABSTRACT

In a hybrid vehicle that does not have a differential rotation absorbing element in the drive system, a hybrid control module controls a driving force to a drive wheel in accordance with a required driving force within a range of a maximum outputable driving force of a traveling drive source. The hybrid control module limits a driving force transmitted to the drive wheel in the HEV mode in accordance with the maximum outputable driving force in the EV mode at the time of the mode transition, when the mode transitions from an EV mode, in which only a first motor/generator is used as the traveling drive source to an HEV mode in which the first motor/generator and an internal combustion engine are used as traveling drive sources when a change in the vehicle speed is occurring.

6 Claims, 22 Drawing Sheets

(51) Int. Cl.
  *B60K 6/442* (2007.10)
  *B60W 10/06* (2006.01)
  *B60W 10/08* (2006.01)
  *B60W 10/11* (2012.01)
  *B60W 20/15* (2016.01)
  *B60K 1/02* (2006.01)
  *B60K 6/387* (2007.10)
  *B60W 50/00* (2006.01)

(52) U.S. Cl.
  CPC .............. *B60L 2240/443* (2013.01); *B60W 2050/0026* (2013.01); *B60W 2510/244* (2013.01); *B60W 2520/10* (2013.01); *B60W 2540/10* (2013.01); *B60W 2710/0666* (2013.01); *B60W 2710/083* (2013.01); *B60W 2710/085* (2013.01); *B60W 2720/30* (2013.01); *Y02T 10/6234* (2013.01); *Y02T 10/6286* (2013.01); *Y02T 10/7258* (2013.01)

(56) References Cited

U.S. PATENT DOCUMENTS

| | | |
|---|---|---|
| 2005/0209044 A1 | 9/2005 | Imazu et al. |
| 2010/0312422 A1 | 12/2010 | Imaseki |
| 2013/0186233 A1 | 7/2013 | Kaltenbach |

FOREIGN PATENT DOCUMENTS

| | | |
|---|---|---|
| JP | 2014-101065 A | 6/2014 |
| JP | 2015-98255 A | 5/2015 |

ENGAGEMENT TABLE

| C2 | C3 | C1 Left | C1 N | C1 Right |
|---|---|---|---|---|
| N | N | EV – ICEgen | Neutral | EV – ICE 3rd |
| N | Left | EV 1st ICE 1st | EV 1st ICE – | EV 1st ICE 3rd |
| N | Right | Lock | EV 1st ICE 2nd | Lock |
| Left | N | EV 1.5 ICE 2nd | EV – ICE 2nd | Lock |
| Left | Right | Lock | EV 2nd ICE 2nd | Lock |
| N | Right | EV 2nd ICE 3rd' | EV 2nd ICE – | EV 2nd ICE 3rd |
| Right | Left | Lock | EV 2nd ICE 4th | Lock |
| Right | N | EV 2.5 ICE 4th | EV – ICE 4th | Lock |
| Right | Left | Lock | EV 1st ICE 4th | Lock |

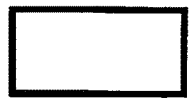 : NORMAL USE GEAR SHIFT STAGE

 : GEAR SHIFT STAGE USED AT LOW SOC, ETC.

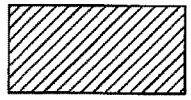 : GEAR SHIFT STAGE THAT CANNOT BE SELECTED BY SHIFT MECHANISM

 : GEAR SHIFT STAGE NOT NORMALLY USED

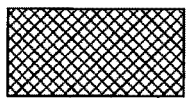 : GEAR SHIFT STAGE THAT CANNOT BE SELECTED BY INTERLOCK

FIG. 4

DEVICE FOR CONTROLLING DRIVING FORCE OF HYBRID VEHICLE

CROSS-REFERENCE TO RELATED APPLICATIONS

This application is a U.S. National stage application of International Application No. PCT/JP2015/069562, filed Jul. 7, 2015.

BACKGROUND

Field of the Invention

The present invention relates to a driving force control device for a hybrid vehicle that is capable of mode transition between an EV mode, in which only an electric motor is used as a traveling drive source, and an HEV mode, in which an electric motor and an internal combustion engine are used as traveling drive sources.

BACKGROUND INFORMATION

Conventionally, a hybrid vehicle that comprises an internal combustion engine and a motor and that is capable of mode transition between an EV mode, in which only the electric motor is used as a traveling drive source, and an HEV mode, in which the electric motor and the internal combustion engine are used as traveling drive sources, is known (for example, see Japanese Laid-Open Patent Application No. 2014-101065 referred to herein as Patent Document 1).

SUMMARY

Meanwhile, in a conventional hybrid vehicle, if the drive system does not have a power transmission element (differential rotation absorbing element) that absorbs the differential rotation of a friction clutch, or the like, the driving force that is output by the internal combustion engine and the electric motor is directly transmitted to the drive wheels. That is, if the internal combustion engine is started and the mode transitions from the EV mode to the HEV mode while traveling, the driving force of the internal combustion engine is added to the driving force of the electric motor and the total is transmitted as the driving force to the drive wheels. Consequently, the driving force that is transmitted to the drive wheels is suddenly increased, and mode transition shock occurs. On the other hand, even if the driving force required by the driver has not changed, there are cases in which the mode transitions from the EV mode to the HEV mode because of a change in the vehicle's speed. At such a time, the driver's sensitivity to shock is high, and the driver is likely to experience discomfort.

In view of the problems described above, an objective of the present invention is to provide a driving force control device for a hybrid vehicle that does not have a differential rotation absorbing element, wherein mode transition shock that occurs when the mode transitions from the EV mode to the HEV mode is less likely to be felt, even when the driver's sensitivity to shock is high.

To achieve the object described above, the hybrid vehicle of the present invention is capable of mode transition between an EV mode, in which only an electric motor is used as a traveling drive source, and an HEV mode, in which an electric motor and an internal combustion engine are used as traveling drive sources, and does not have a differential rotation absorbing element as part of the drive system. In addition, the hybrid vehicle is provided with a driving force control unit that controls the driving force transmitted to the drive wheels in accordance with the required driving force, within a range of the maximum outputable driving force of the traveling drive source. Then, when the mode transitions from the EV mode to the HEV mode accompanying a change in the vehicle speed, this driving force control unit limits the driving force transmitted to the drive wheels in the HEV mode in accordance with the maximum outputable driving force in the EV mode at the time of the mode transition.

In the case of a hybrid vehicle that does not have a differential rotation absorbing element as part of the drive system, the driving force that is output from the traveling drive source is directly transmitted to the drive wheels. In contrast, in the present invention, when the mode transitions from the EV mode to the HEV mode accompanying a change in the vehicle speed, the driving force transmitted to the drive wheels in the HEV mode is limited in accordance with the maximum outputable driving force in the EV mode at the time of the mode transition. Accordingly, even if the driving force of the internal combustion engine is added to the driving force of the electric motor as the driving force transmitted to the drive wheels due to a mode transition to the HEV mode, it is possible to suppress a sudden increase in the driving force that is transmitted to the drive wheels. Mode transition shock is thereby suppressed, and it is possible to prevent the driver from experiencing discomfort, even if the driver's sensitivity to shock is high, because the mode is transitioning from the EV mode to the HEV mode accompanying a change in the vehicle speed. That is, in a hybrid vehicle that does not have a differential rotation absorbing element, it is possible to make the mode transition shock that occurs when the mode transitions from the EV mode to the HEV mode less likely to be experienced, even when the driver's sensitivity to shock is high.

BRIEF DESCRIPTION OF THE DRAWINGS

Referring now to the drawings, a drive system and a hybrid vehicle control system are illustrated.

FIG. 4 is an engagement table illustrating the gear shift stages according to the switching positions of three engagement clutches in the multistage gear transmission of the first embodiment.

DETAILED DESCRIPTION OF THE EMBODIMENTS

Figure 1:
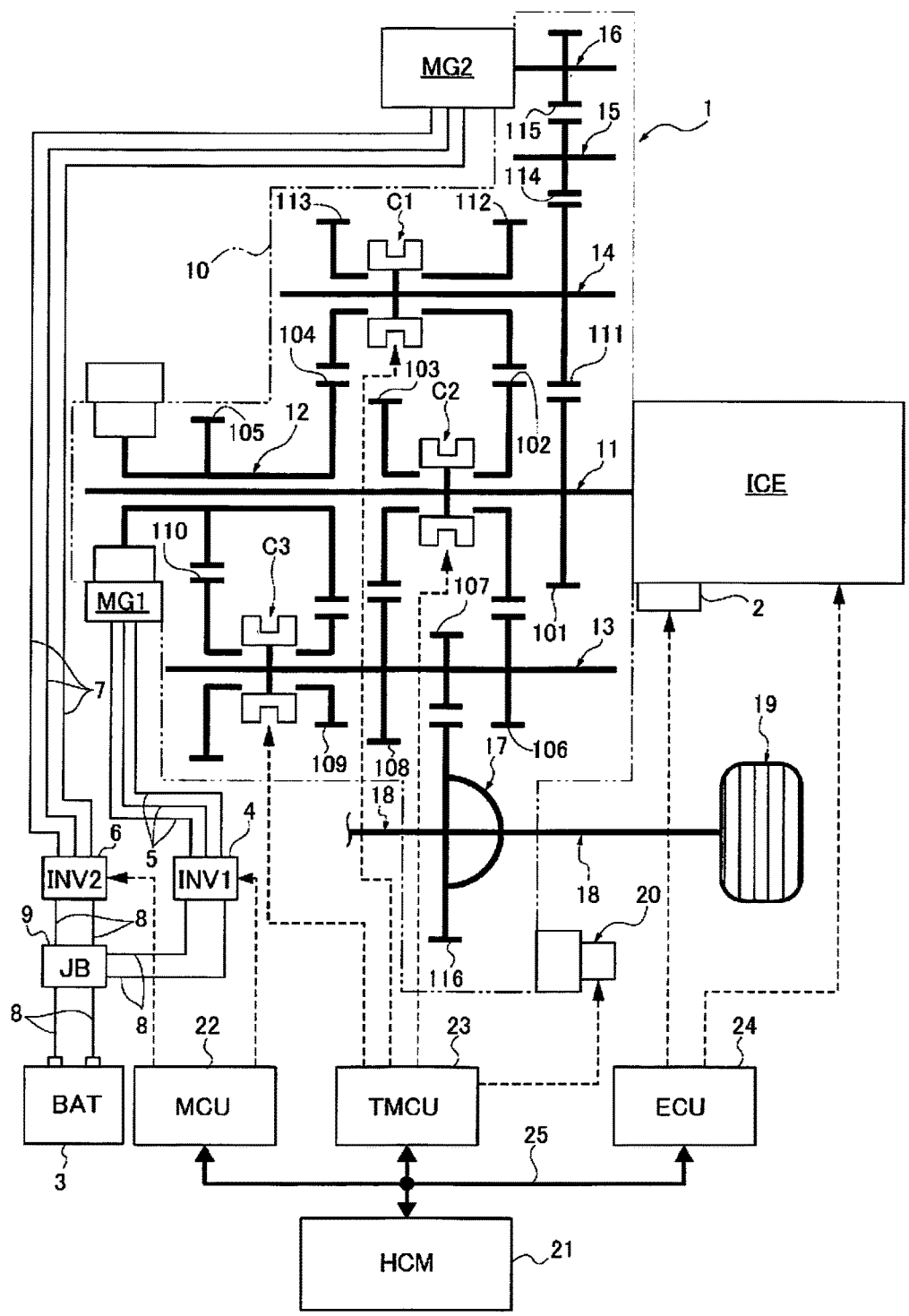
FIG. 1 is an overall system view illustrating a drive system and a hybrid vehicle control system to which the driving force control device of the first embodiment is applied.

A preferred embodiment for realizing the driving force control device for a hybrid vehicle according to the present invention is described below, based on the first embodiment and the second embodiment illustrated in the drawings.

First Embodiment

The configuration is described first. The driving force control device of the first embodiment is applied to a hybrid vehicle (one example of a hybrid vehicle), comprising, as drive system components, one engine, two motor/generators, and a multistage gear transmission having three engagement clutches. The "overall system configuration," the "configuration of the shift control system," the "configuration of the gear shift stages," and the "configuration of the driving force control process" will be separately described below, with regard to the configuration of the driving force control device for a hybrid vehicle in the first embodiment.

Overall System Configuration

FIG. 1 illustrates a drive system and a control system of a hybrid vehicle to which is applied the driving force control device of the first embodiment. The overall system configuration of the first embodiment will be described below, based on FIG. 1.

The drive system of the hybrid vehicle of the first embodiment comprises an internal combustion engine ICE, a first motor/generator MG1, a second motor/generator MG2, and a multistage gear transmission 1 having three engagement clutches C1, C2, C2, as illustrated in FIG. 1. "ICE" is an acronym for "Internal Combustion Engine."

The internal combustion engine ICE acts as a traveling drive source of a hybrid vehicle, and is, for example, a gasoline engine or a diesel engine that is disposed in a forward space of a vehicle such that the crankshaft direction is in the vehicle width direction. This internal combustion engine ICE is connected to a transmission case 10 of the multistage gear transmission 1, and the output shaft of the internal combustion engine is connected to a first shaft 11 of the multistage gear transmission 1. In starting an internal combustion engine ICE, the second motor/generator MG2 is used as a starter motor. However, a starter motor 2 is provided in preparation for when starting by the second motor/generator MG2 using a high-power battery 3 cannot be ensured, such as during extreme cold.

The first motor/generator MG1 (electric motor) is a permanent magnet type synchronous motor utilizing a three-phase alternating current, which acts as a traveling drive source in a hybrid vehicle at the time of powering, and acts as a generator at the time of regeneration. In addition, the second motor/generator MG2 is a permanent magnet type synchronous motor utilizing a three-phase alternating current, which acts as a motor that rotates a gear shaft of the multistage gear transmission 1 and the starter motor of the internal combustion engine ICE at the time of powering, and acts as a generator at the time of being driven by the internal combustion engine ICE. Both the first motor/generator MG1 and the second motor/generator MG2 have the high-power battery 3 as a common power source during powering. Additionally, the electric power generated by the first motor/generator MG1 and the second motor/generator MG2 is charged in this high-power battery 3. The stator of the first motor/generator MG1 is fixed to a case of the first motor/generator MG1, and the case is fixed to the transmission case 10 of the multistage gear transmission 1. Then, a first motor shaft integrated with a rotor of the first motor/generator MG1 is connected to a second shaft 12 of the multistage gear transmission 1. The stator of the second motor/generator MG2 is fixed to a case of the second motor/generator MG2, and the case is fixed to the transmission case 10 of the multistage gear transmission 1. Then, a second motor shaft integrated with a rotor of the second motor/generator MG2 is connected to a sixth shaft 16 of the multistage gear transmission 1. A first inverter 4, which converts direct current to three-phase alternating current during powering and converts three-phase alternating current to direct current during regeneration, is connected to a stator coil of the first motor/generator MG1 via a first AC harness 5. A second inverter 6, which converts direct current to three-phase alternating current during powering and converts three-phase alternating current to direct current during power generation, is connected to a stator coil of the second motor/generator MG2 via a second AC harness 7. The high-power battery 3, the first inverter 4, and the second inverter 6 are connected by a DC harness 8 via a junction box 9.

The hybrid vehicle of the first embodiment comprises an "EV mode" and an "HEV mode" as traveling modes. The EV mode is a traveling mode in which only the first motor/generator MG1 is used as the traveling drive source. The HEV mode is a traveling mode in which the first motor/generator MG1 and the internal combustion engine ICE are used as traveling drive sources. Mode transition between the EV mode and the HEV mode is possible, based on the vehicle speed, and the required driving force of the driver (driving force) as reflected in the accelerator position opening amount and the braking operation.

The multistage gear transmission 1 comprises multiple gear pairs having different transmission ratios, and shifting elements that switch between gear shift stages, and is a normally meshing transmission that realizes multiple gear shift stages. This multistage gear transmission 1 is disposed in a power transmission path from the internal combustion engine ICE, the first motor/generator MG1, and the second motor/generator MG2 to the drive wheels 19. The multistage gear transmission 1 comprises six gear shafts 11-16 provided with gears and disposed parallel to each other inside the transmission case 10, and three engagement clutches C1, C2, C3 for selecting a gear pair. A first shaft 11, a second shaft 12, a third shaft 13, a fourth shaft 14, a fifth shaft 15, and a sixth shaft 16 are provided as gear shafts. A first engagement clutch C1, a second engagement clutch C2, and a third engagement clutch C3 are provided as engagement clutches. Here, the first, second, and third engagement clutches C1, C2, C3 are dog clutches that engage/disengage the engagement state at the time of shifting. The transmission case 10 is provided with an electric oil pump 20 that supplies lubrication oil to the meshing portions of the gears and the axle bearing portions inside the case.

The first shaft 11 is a shaft that is connected to the internal combustion engine output shaft of the internal combustion engine ICE. A first gear 101, a second gear 102, and a third gear 103 are disposed on this first shaft 11, in order from the right side as shown in FIG. 1. The first gear 101 is integrally provided (including integral fixing) to the first shaft 11. The second gear 102 and the third gear 103 are idling gears, in which a boss portion that protrudes in the axial direction is inserted into the outer perimeter of the first shaft 11, and are provided so as to be drivably connectable to the first shaft 11 via the second engagement clutch C2.

The second shaft 12 is connected to a first motor shaft of the first motor/generator MG1, and is a cylindrical shaft that is coaxially disposed with the axis aligned with the outer side position of the first shaft 11. A fourth gear 104 and a fifth gear 105 are disposed on this second shaft 12, in order from the right side as shown in FIG. 1. The fourth gear 104 and the fifth gear 105 are integrally provided (including integral fixing) to the second shaft 12.

The third shaft 13 is a shaft disposed on the output side of multistage gear transmission 1 and in which both ends are supported to the transmission case 10. A sixth gear 106, a seventh gear 107, an eighth gear 108, a ninth gear 109, and a tenth gear 110 are disposed on this third shaft 13, in order from the right side as shown in FIG. 1. The sixth gear 106, the seventh gear 107, and the eighth gear 108 are integrally provided (including integral fixing) to the third shaft 13. The ninth gear 109 and the tenth gear 110 are idling gears, in which a boss portion that protrudes in the axial direction is inserted into the outer perimeter of the third shaft 13, and are provided so as to be drivably connectable to the third shaft 13 via the third engagement clutch C3. Then, the sixth gear 106 meshes with the second gear 102 provided on the first shaft 11, the seventh gear 107 meshes with a sixteenth gear 116 of a differential gear 17, and the eighth gear 108 meshes with the third gear 103 provided on the first shaft 11. The ninth gear 109 meshes with the fourth gear 104 provided on the second shaft 12, and the tenth gear 110 meshes with the fifth gear 105 provided on the second shaft 12.

The fourth shaft 14 is a shaft in which both ends are supported to the transmission case 10. An eleventh gear 111, a twelfth gear 112, and a thirteenth gear 113 are disposed on this fourth shaft 14, in order from the right side as shown in FIG. 1. The eleventh gear 111 is integrally provided (including integral fixing) to the fourth shaft 14. The twelfth gear 112 and the thirteenth gear 113 are idling gears, in which a boss portion that protrudes in the axial direction is inserted onto the outer perimeter of the fourth shaft 14, and are provided so as to be drivably connectable to the fourth shaft 14 via the first engagement clutch C1. Then, the eleventh gear 111 meshes with the first gear 101 provided on the first shaft 11, the twelfth gear 112 meshes with a second gear 102 provided on the first shaft 11, and the thirteenth gear 113 meshes with the fourth gear 104 provided on the second shaft 12.

The fifth shaft 15 is a shaft in which both ends are supported to the transmission case 10. A fourteenth gear 114 that meshes with the eleventh gear 111 provided on the fourth shaft 14 is integrally provided (including integral fixing) to this fifth shaft 15.

The sixth shaft 16 is a shaft connected to a second motor shaft of the second motor/generator MG2. A fifteenth gear 115 that meshes with the fourteenth gear 114 provided on the fifth shaft 15 is integrally provided (including integral fixing) to this sixth shaft 16.

Then, the second motor/generator MG2 and the internal combustion engine ICE are mechanically connected to each other by a gear train configured from the fifteenth gear 115, the fourteenth gear 114, the eleventh gear 111, and the first gear 101, which mesh with one another. This gear train serves as a reduction gear train that decelerates the second motor/generator MG2 rotational speed (MG2 rotation speed) when starting the internal combustion engine ICE by the second motor/generator MG2, and serves as a speed increasing gear train that accelerates the internal combustion engine rotational speed (ICE rotation speed) when generating power by the second motor/generator MG2 with the driving of the internal combustion engine ICE.

The first engagement clutch C1 is interposed between the twelfth gear 112 and the thirteenth gear 113 provided on the fourth shaft 14. This first engagement clutch C1 is a dog clutch that is engaged by an engagement stroke in a rotationally synchronized state, without possessing a synchronization mechanism. When the first engagement clutch C1 is in a left engagement position (Left), the fourth shaft 14 and the thirteenth gear 113 are drivingly connected. In addition, when in a neutral position (N), this first engagement clutch C1 releases both the twelfth gear 112 and the thirteenth gear 113 with respect to the fourth shaft 14. Furthermore, when this first engagement clutch C1 is in a right engagement position (right), the fourth shaft 14 and the twelfth gear 112 are drivingly connected.

The second engagement clutch C2 is interposed between the second gear 102 and the third gear 103 provided on the first shaft 11. This second engagement clutch C2 is a dog clutch that is engaged by an engagement stroke in a rotationally synchronized state, without possessing a synchronization mechanism. When the second engagement clutch C2 is in a left engagement position (Left), the first shaft 11 and the third gear 103 are drivingly connected. In addition, when in a neutral position (N), this second engagement clutch C2 releases both the second gear 102 and the third gear 103 with respect to the first shaft 11. Furthermore, when this second engagement clutch C2 is in a right engagement position (Right), the first shaft 11 and the second gear 102 are drivingly connected.

The third engagement clutch C3 is interposed between the ninth gear 109 and the tenth gear 110 provided on the third shaft 13. This third engagement clutch C3 is a dog clutch that is engaged by an engagement stroke in a rotationally synchronized state, without possessing a synchronization mechanism. When the third engagement clutch C3 is in a left engagement position (Left), the third shaft 13 and the tenth gear 110 are drivingly connected. In addition, when in a neutral position (N), this third engagement clutch C3 releases both the ninth gear 109 and the tenth gear 110 with respect to the third shaft 13. Furthermore, when this third engagement clutch C3 is in a right engagement position (Right), the third shaft 13 and the ninth gear 109 are drivingly connected.

Then, the sixteenth gear 116 that meshes with the seventh gear 107 integrally provided (including integral fixing) to the third shaft 13 of the multistage gear transmission 1 is connected to left and right drive wheels 19 via the differential gear 17 and left and right drive shafts 18.

The control system of the vehicle of the first embodiment comprises a hybrid control module 21, a motor control unit 22, a transmission control unit 23, and an engine control unit 24, as illustrated in FIG. 1.

The hybrid control module 21 (acronym: "HCM") is an integrated control module having a function to appropriately manage the energy consumption of the entire vehicle. This hybrid control module 21 is connected to the other control units (motor control unit 22, transmission control unit 23, engine control unit 24, etc.) so as to be capable of bidirectional information exchange by a CAN communication line 25. The "CAN" in CAN communication line 25 is an acronym for "Control unit Area Network."

In addition, this hybrid control module 21 controls the driving force that is transmitted to the drive wheels 19 in accordance with the required driving force of the driver, within a range of the maximum driving force that can be output by the traveling drive source (maximum outputable driving force). That is, the driving force that is output from the traveling drive source (In the EV mode, only the output torque of the first motor/generator MG1 (MG1 torque). In the HEV mode, the total torque of the MG1 torque and the output torque from the internal combustion engine ICE (ICE torque).) is controlled so as to satisfy the required driving force, which is reflected in the accelerator position opening amount. If the required driving force exceeds the maximum outputable driving force of the traveling drive source, the driving force that is output from the traveling drive source is set to the maximum value, such that the driving force requirement can be satisfied as much as possible.

Furthermore, when the traveling mode transitions from the EV mode to the HEV mode accompanying a change in the vehicle speed, the hybrid control module 21 of the first embodiment sets the maximum value of the driving force transmitted to the drive wheels 19 in the HEV mode to a value that is equivalent to the maximum outputable driving force in the EV mode at the time of a mode transition. Additionally, when the traveling mode transitions from the EV mode to the HEV mode accompanying a change in the required driving force of the driver, the maximum value of the driving force transmitted to the drive wheels 19 in the HEV mode is set to the maximum outputable driving force in the HEV mode. That is, this hybrid control module 21 corresponds to a driving force control unit, and limits the driving force transmitted to the drive wheels 19 in the HEV mode at the time of a mode transition from the EV mode to the HEV mode accompanying a change in the vehicle speed, and does not limit the driving force transmitted to the drive wheels 19 in the HEV mode at the time of a mode transition from the EV mode to the HEV mode accompanying a change in the required driving force.

The motor control unit 22 (acronym: "MCU") carries out powering control, regeneration (power generation) control, and the like, of the first motor/generator MG1 and the second motor/generator MG2, by means of control commands to the first inverter 4 and the second inverter 6. The control modes for the first motor/generator MG1 and the second motor/generator MG2 are "torque control" and "rotational speed FB control." In the "torque control," a control is carried out in which the actual motor torque is caused to pursue a target motor torque, when a target motor torque to be shared with respect to a target driving force is determined during powering. In the "rotational speed FB control," a control is carried out in which a target motor rotation speed, with which the input/output rotational speeds of the clutch are synchronized, is determined, and an FB torque is output to converge the actual motor rotation speed with the target motor rotation speed, when there is a gear shift request to mesh and engage any one of the engagement clutches C1, C2, C3 during traveling.

The transmission control unit 23 (acronym "TMCU") carries out a shift control for switching the gear shift pattern of the multistage gear transmission 1, by outputting a current command to the first, second, and third electric actuators 31, 32, 33 (refer to FIG. 2), based on predetermined input information. In this shift control, the first, second, and third engagement clutches C1, C2, C3 are selectively mesh engaged/released, and a gear pair involved in power transmission is selected from the multiple gear pairs. Here, at the time of a gear shift request to engage any one of the released engagement clutches C1, C2, C3, to suppress the differential rotation speed between the input/output of the clutch to ensure meshing and engaging, a rotational speed FB control (rotation synchronization control) of the first motor/generator MG1 or the second motor/generator MG2 is used in combination.

The engine control unit 24 (acronym: "ECU") carries out start control of the internal combustion engine ICE, stop control of the internal combustion engine ICE, fuel cut control, and the like, by outputting a control command to the motor control unit 22, a spark plug, a fuel injection actuator, or the like, based on predetermined input information.

Configuration of the Shift Control System

The multistage gear transmission 1 according to the first embodiment achieves efficiency by reducing drag of the clutch by employing, as shifting elements, first, second, and third engagement clutches C1, C2, C3 (dog clutch) that are meshed and engaged. Then, when there is a gear shift request to mesh and engage any one of the first, second, and third engagement clutches C1, C2, C3, the differential rotation speeds of the input/output of the clutch are synchronized by the first motor/generator MG1 (when the third engagement clutch C3 is engaged) or the second motor/generator MG2 (when the first and second engagement clutches C1, C2 are engaged), and an engagement stroke is started once the rotational speed falls within a synchronization determination rotational speed range, to realize the gear shift. In addition, when there is a gear shift request to release any one of the engaged first, second, and third engagement clutches C1, C2, C3, the clutch transmission torque of the clutch to be released is reduced, and a disengagement stroke is started once the torque becomes equal to or less than a release torque determination value, to realize the gear shift. The configuration of the shift control system of the multistage gear transmission 1 is described below based on FIG. 2.

Figure 2:
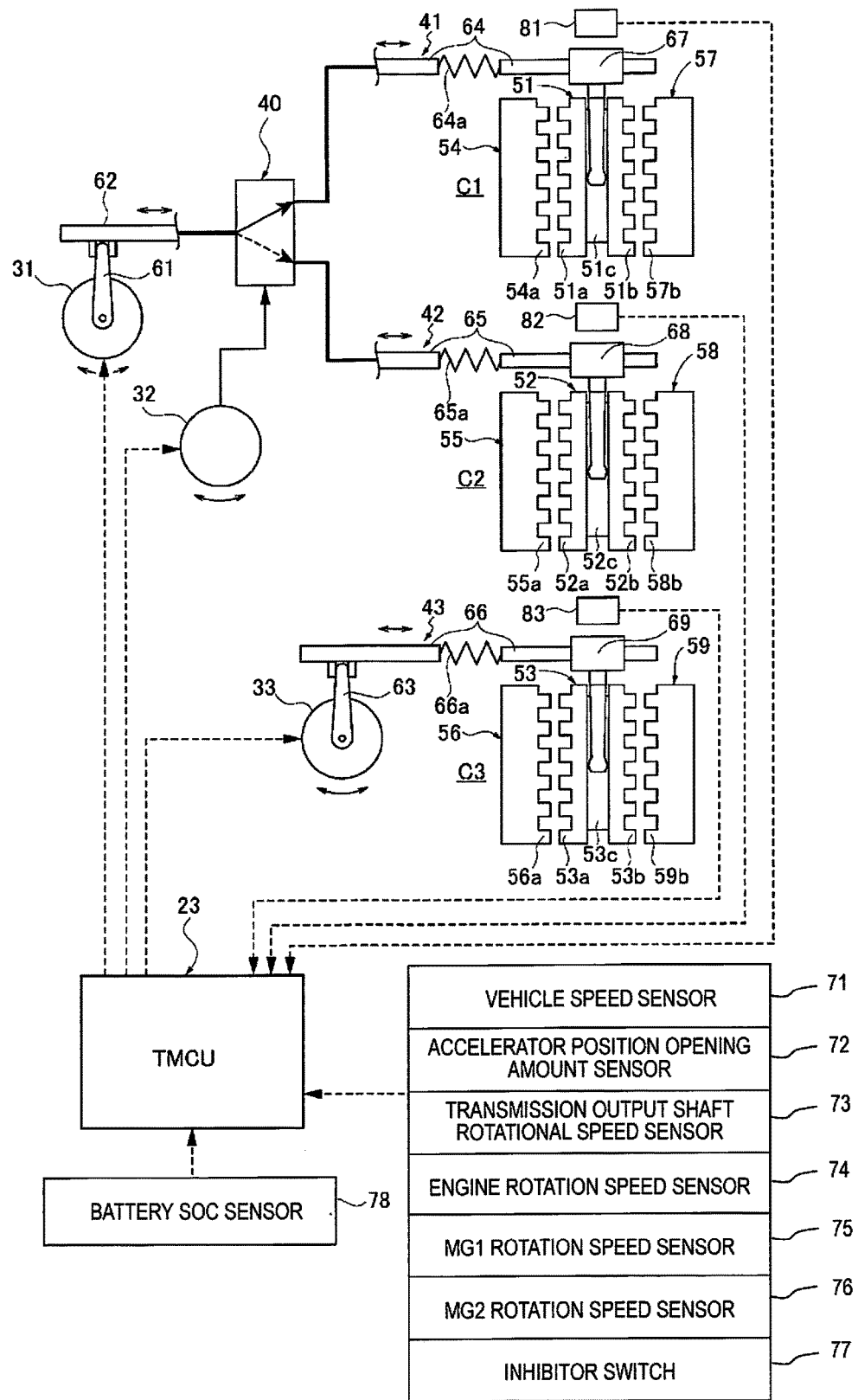
FIG. 2 is a control system block view illustrating the configuration of a shift control system of the multistage gear transmission of the first embodiment.

The shift control system comprises, as engagement clutches, a first engagement clutch C1, a second engagement clutch C2, and a third engagement clutch C3, as illustrated in FIG. 2. A first electric actuator 31 for C1, C2 shift operation, a second electric actuator 32 for C1, C2 select operation, and a third electric actuator 33 for C3 shift operation, are provided as actuators. A C1/C2 select operation mechanism 40, a C1 shift operation mechanism 41, a C2 shift operation mechanism 42, and a C3 shift operation mechanism 43 are provided as shift mechanisms that convert actuator operations into clutch engagement/disengagement operations. Furthermore, a transmission control unit 23 is provided as a control means of the first electric actuator 31, the second electric actuator 32, and the third electric actuator 33.

The first engagement clutch C1, the second engagement clutch C2, and the third engagement clutch C3 are dog clutches that switch between a neutral position (N: disengaged position), a left engagement position (Left: left side clutch meshing engagement position), and a right engagement position (Right: right side clutch meshing engagement position). The engagement clutches C1, C2, C3 all have the same configuration, comprising coupling sleeves 51, 52, 53, left dog clutch rings 54, 55, 56, and right dog clutch rings 57, 58, 59. The coupling sleeves 51, 52, 53 are provided so as to be strokable in the axial direction by a spline connection via a hub, which is not shown, fixed to the fourth shaft 14, the first shaft 11, and the third shaft 13, and have dog teeth 51a, 51b, 52a, 52b, 53a, 53b on both sides having flat top faces. Furthermore, fork grooves 51c, 52c, 53c are provided to the circumferential center portions of the coupling sleeves 51, 52, 53. The left dog clutch rings 54, 55, 56 are fixed to the boss portions of the gears 113, 103, 110, which are left idling gears of the engagement clutches C1, C2, C3, and have dog teeth 54a, 55a, 56a with flat top faces that oppose the dog teeth 51a, 52a, 53a. The right dog clutch rings 57, 58, 59 are fixed to the boss portions of the gears 112, 102, 109, which are right idling gears of the engagement clutches C1, C2, C3, and have dog teeth 57b, 58b, 59b with flat top faces that oppose the dog teeth 51b, 52b, 53b.

The C1/C2 select operation mechanism 40 is a mechanism for selecting between a first position for selecting a connection between the first electric actuator 31 and the C1 shift operation mechanism 41, and a second position for selecting a connection between the first electric actuator 31 and the C2 shift operation mechanism 42. When selecting the first position, a shift rod 62 and a shift rod 64 of the first engagement clutch C1 are connected, and a shift rod 65 of the second engagement clutch C2 is locked in the neutral position. When selecting the second position, a shift rod 62 and the shift rod 65 of the second engagement clutch C2 are connected, and the shift rod 64 of the first engagement clutch C1 is locked in the neutral position. That is, the mechanism is such that, when selecting a position from among the first position and the second position where one of the engagement clutches is shifted, the other engagement clutch is locked and fixed in the neutral position.

The C1 shift operation mechanism 41, the C2 shift operation mechanism 42, and the C3 shift operation mechanism 43 are mechanisms for converting the turning motions of the first and third electric actuators 31, 33 into axial stroke motions of the coupling sleeves 51, 52, 53. The shift operating mechanisms 41, 42, 43 all have the same configuration, comprising turning links 61, 63, shift rods 62, 64, 65, 66, and shift forks 67, 68, 69. One of the ends of the turning links 61, 63 are provided to the actuator shafts of the first and third electric actuators 31, 33, and the other ends are connected to the shift rods 64 (or shift rod 65), 66 so as to be relatively displaceable. The shift rods 64, 65, 66 are configured to expand and contract according to the magnitude and direction of the rod transmitting force, by having springs 64a, 65a, 66a interposed in the rod dividing positions. One of the ends of the shift forks 67, 68, 69 are fixed to the shift rods 64, 65, 66, and the other ends are disposed in the fork grooves 51c, 52c, 53c of the coupling sleeves 51, 52, 53.

The transmission control unit 23 inputs sensor signals and switch signals from a vehicle speed sensor 71, an accelerator position opening amount sensor 72, a transmission output shaft rotational speed sensor 73, an engine rotation speed sensor 74, an MG1 rotation speed sensor 75, an MG2 rotation speed sensor 76, an inhibitor switch 77, a battery SOC sensor 78, and the like. The transmission output shaft rotational speed sensor 73 is provided to the shaft end portion of the third shaft 13 and detects the shaft rotation speed of the third shaft 13. Furthermore, the transmission control unit 23 is provided with a position servo control unit (for example a position servo system by PID control), which controls mesh engagement and disengagement of the engagement clutches C1, C2, C3, as determined by the positions of the coupling sleeves 51, 52, 53. This position servo control unit inputs sensor signals from a first sleeve position sensor 81, a second sleeve position sensor 82, and a third sleeve position sensor 83. Then, the sensor values of the sleeve position sensors 81, 82, 83 are read, and a current is imparted to the electric actuators 31, 32, 33 such that the positions of the coupling sleeves 51, 52, 53 will be in the disengaged position or the engagement position according to an engagement stroke. That is, by setting an engaged state in which the dog teeth welded to the coupling sleeves 51, 52, 53 and the dog teeth welded to the idling gears are both in engagement positions meshed with each other, the idling gears are drivingly connected to the fourth shaft 14, the first shaft 11, and the third shaft 13. On the other hand, by setting a disengaged state in which the dog teeth welded to the coupling sleeves 51, 52, 53 and the dog teeth welded to the idling gears are in non-engagement positions by displacing the coupling sleeves 51, 52, 53 in the axial direction, the idling gears are disconnected from the fourth shaft 14, the first shaft 11, and the third shaft 13.

Configuration of the Gear Shift Stages]

The multistage gear transmission 1 of the first embodiment achieves size reduction by reducing the power transmission loss by not having a power transmission element (differential rotation absorbing element) that is capable of power transmission while absorbing the differential rotation speed between the input side and the output side of a friction clutch, a fluid coupling, and the like, and by reducing the gear shift stages of the ICE by providing motor assistance to the internal combustion engine ICE (EV gear shift stages: 1-2 speed, ICE gear shift stages: 1-4 speed). In addition, since the multistage gear transmission 1 does not have a differential rotation absorbing element, the hybrid vehicle of the first embodiment will not have a differential rotation absorbing element in the drive system; therefore, the driving force that is output from the traveling drive source is directly transmitted to the drive wheels 19.

Figure 3:
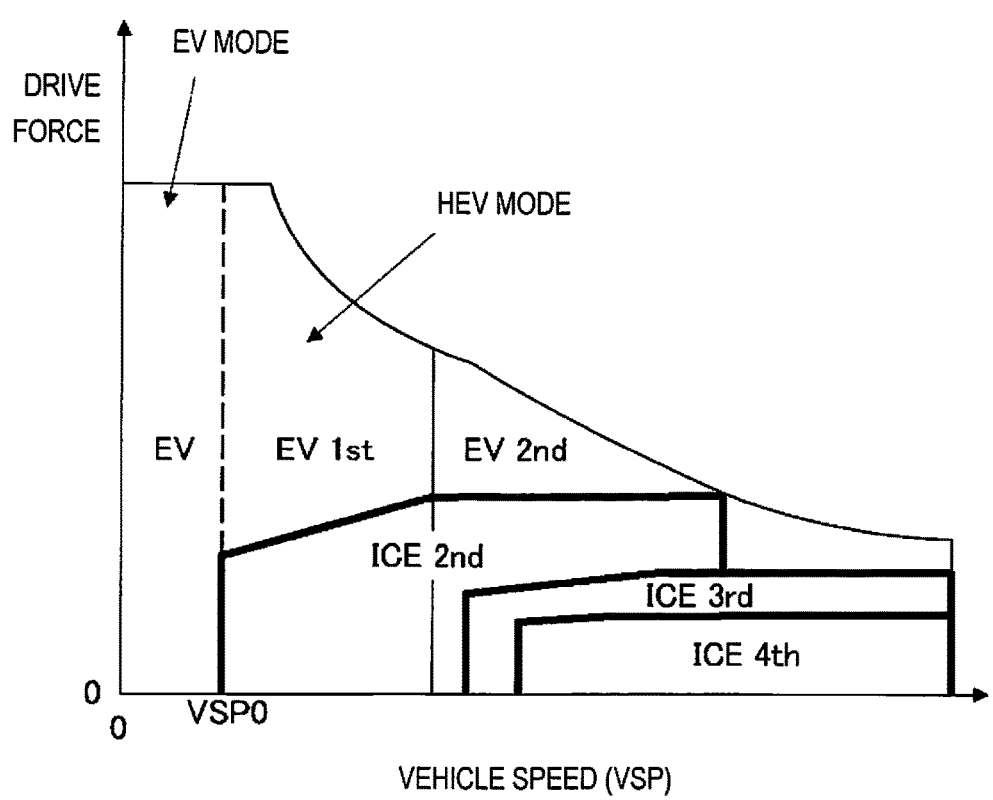
FIG. 3 is a schematic overview of a shifting map illustrating the concept of switching the gear shift pattern of the multistage gear transmission of the first embodiment.

The configuration of the gear shift stages of the multistage gear transmission 1 is described below based on FIG. 3 and FIG. 4. A concept of gear shift stages is employed in which, when the vehicle speed (VSP) is in a starting region that is less than a predetermined vehicle speed VSP0, since the multistage gear transmission 1 does not have a differential rotation absorbing element, a gear shift stage to select the "EV mode" is set, and a motor start by only the motor driving force is carried out, as illustrated in FIG. 3. Then, when in a traveling region in which the vehicle speed is equal to or greater than the predetermined vehicle speed VSP0, a gear shift stage to select a "parallel HEV mode," in which the engine driving force is assisted by the motor driving force, is set, according to a requirement of the driving force, so as to respond to the requirement by the motor driving force and the engine driving force, as illustrated in FIG. 3. That is, as the vehicle speed increases, the ICE gear shift stages shift from (ICE1st) →ICE2nd→ICE3rd→ICE4th, and the EV gear shift stages shift from EV1st→EV2nd. Therefore, based on the concept of the gear shift stages illustrated in FIG. 3, a shifting map for issuing gear shift requests for switching the gear shift stage is created.

On the other hand, all of the gear shift stages theoretically achievable by the multistage gear transmission 1 having the first, second, and third engagement clutches C1, C2, C3 are as shown in FIG. 4. In FIG. 4, "Lock" represents an interlock gear shift stage that is not applicable as a gear shift stage, "EV-" represents a state in which the first motor/generator MG1 is not drivingly connected to the driving wheels 19, and "ICE-" and "ICEgen" represent a state in which the internal combustion engine ICE is not drivingly connected to the driving wheels 19. Here, when the internal combustion engine ICE is not drivingly connected to the drive wheels 19 (in a tie of "ICE-" and "ICEgen"), the "EV mode" is set. In addition, when both the ICE gear shift stage and the EV gear shift stage are established, the first motor/generator MG1 and the internal combustion engine ICE are drivingly connected to the drive wheels 19, and the "HEV mode" is set. That is, the traveling mode of the hybrid vehicle is set according to the gear shift stage of the multistage gear transmission 1. Each of the gear shift stages is described below.

When the second engagement clutch C2 is "N" and the third engagement clutch C3 is "N," the following gear shift stages are obtained according to the position of the first engagement clutch C1. "EV-ICEgen" is obtained if the first engagement clutch C1 is "Left," "Neutral" is obtained if the first engagement clutch C1 is "N," and "EV-ICE3rd" is obtained if the first engagement clutch C1 is "Right." Here, the gear shift stage "EV-ICEgen" is a gear shift stage selected at the time of MG1 idle power generation, in which power is generated in the first motor/generator MG1 by the internal combustion engine ICE when the vehicle is stopped, or at the time of double idle power generation in which MG2 power generation is carried out in addition to MG1 idle power generation. The gear shift stage "Neutral" is a gear shift stage selected at the time of MG2 idle power generation, in which power is generated in the second motor/generator MG2 by the internal combustion engine ICE when the vehicle is stopped. The gear shift stage "EV-ICE3rd" is a gear shift stage selected when in the "ICE traveling mode," in which the first motor/generator MG1 is stopped, and third-speed ICE traveling is carried out by the internal combustion engine ICE.

When the second engagement clutch C2 is "N" and the third engagement clutch C3 is "Left," the following gear shift stages are obtained according to the position of the first engagement clutch C1. "EV1st ICE1st" is obtained if the first engagement clutch C1 is "Left," "EV1st ICE-" is obtained if the first engagement clutch C1 is "N," and "EV1st ICE3rd" is obtained if the first engagement clutch C1 is "Right." Here, the gear shift stage "EV 1st ICE-" is a gear shift stage selected when in the "EV mode" in which the internal combustion engine ICE is stopped and traveling (regeneration) is carried out by the first motor/generator MG1, or in the "series HEV mode" in which first-speed EV traveling is carried out by the first motor/generator MG1 while power is generated in the second motor/generator MG2 by the internal combustion engine ICE.

When the second engagement clutch C2 is "Left" and the third engagement clutch C3 is "Left," "EV1st ICE2nd" is obtained if the position of the first engagement clutch C1 is "N."

When the second engagement clutch C2 is "Left" and the third engagement clutch C3 is "N," the following gear shift stages are obtained according to the position of the first engagement clutch C1. "EV1.5 ICE2nd" is obtained if the first engagement clutch C1 is "Left," and "EV-ICE2nd" is obtained if the first engagement clutch C1 is "N." Here, the gear shift stage "EV-ICE2nd" is a gear shift stage selected when in the "ICE traveling mode," in which the first motor/generator MG1 is stopped, and second-speed ICE traveling is carried out by the internal combustion engine ICE.

When the second engagement clutch C2 is "Left" and the third engagement clutch C3 is "Right," "EV2nd ICE2nd" is obtained if the position of the first engagement clutch C1 is "N."

When the second engagement clutch C2 is "N" and the third engagement clutch C3 is "Right," the following gear shift stages are obtained according to the position of the first engagement clutch C1. "EV2nd ICE3rd'" is obtained if the first engagement clutch C1 is "Left," "EV2nd ICE-" is obtained if the first engagement clutch C1 is "N," and "EV2nd ICE3rd" is obtained if the first engagement clutch C1 is "Right." Here, the gear shift stage "EV2nd ICE-" is a gear shift stage selected when in the "EV mode" in which the internal combustion engine ICE is stopped and traveling (regeneration) is carried out by the first motor/generator MG1, or in the "series HEV mode" in which second-speed EV traveling is carried out by the first motor/generator MG1 while power is generated in the second motor/generator MG2 by the internal combustion engine ICE.

When the second engagement clutch C2 is "Right" and the third engagement clutch C3 is "Right," "EV 2nd ICE4th" is obtained if the position of the first engagement clutch C1 is "N."

When the second engagement clutch C2 is "Right" and the third engagement clutch C3 is "N," the following gear shift stages are obtained according to the position of the first engagement clutch C1. "EV2.5 ICE4th" is obtained if the first engagement clutch C1 is "Left," and "EV-ICE4th" is obtained if the first engagement clutch C1 is "N." Here, the gear shift stage "EV-ICE4th" is a gear shift stage selected when in the "ICE traveling mode," in which the first motor/generator MG1 is stopped, and fourth-speed ICE traveling is carried out by the internal combustion engine ICE.

When the second engagement clutch C2 is "Right" and the third engagement clutch C3 is "Left," "EV1st ICE4th" is obtained if the position of the first engagement clutch C1 is "N."

Described next is a method to separate the "normal use gear shift stage" from all the above-described gear shift stages achieved by engagement combinations of the engagement clutches C1, C2, C3.

First, gear shift stages excluding the "interlock gear shift stages (cross-hatching in FIG. 4)" and "gear shift stages that cannot be selected by the shift mechanism (right up hatching in FIG. 4)" from all the gear shift stages shall be the multiple gear shift stages that can be achieved by the multistage gear transmission 1. Here, gear shift stages that cannot be selected by the shift mechanism refers to "EV1.5 ICE2nd," in which the first engagement clutch C1 is "Left" and the second engagement clutch C2 is "Left," and "EV2.5 ICE4th," in which the first engagement clutch C1 is "Left" and the second engagement clutch C2 is "Right." The reason they are not able to be selected by the shift mechanism is that one first electric actuator 31 is a shift actuator that is shared for use with two engagement clutches C1, C2, and one of the engagement clutches is neutral locked by the C1/C2 select operation mechanism 40.

Then, gear shift stages excluding the "gear shift stages not normally used (right down hatching in FIG. 4)" and "gear shift stages used with low SOC, etc. (dashed line frame in FIG. 1)" from the multiple gear shift stages that can be achieved by the multistage gear transmission 4 shall be the "normal use gear shift stage (thick line frame in FIG. 4)." Here, the "gear shift stages not normally used" are "EV2nd ICE3rd'" and "EV1st ICE4th," and the "gear shift stages used with low SOC, etc." are "EV-ICEgen" and "EV1st ICE1st."

Therefore, "normal use gear shift stages" are configured by adding "Neutral" to EV gear shift stages to be put in the EV mode (EV1st ICE-, EV2nd ICE-), ICE gear shift stages (EV-ICE2nd, EV-ICE3rd, EV-ICE4th), and combination gear shift stages to be put in the HEV mode (EV1st ICE2nd, EV1st ICE3rd, EV2nd ICE2nd, EV2nd ICE3rd, EV2nd ICE4th).

Configuration of the Driving Force Control Process

Figure 5A:
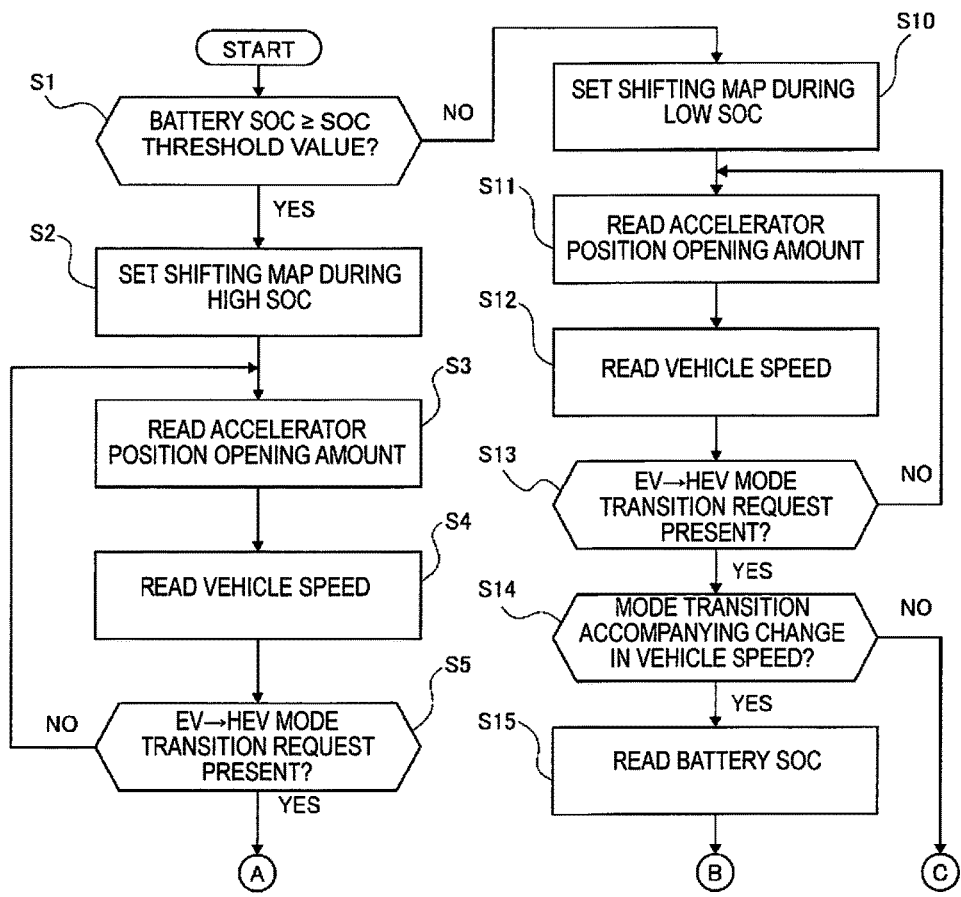
FIG. 5A is a flowchart illustrating the flow of the driving force control process (Step S1-Step S5, Step S10-Step S15) that is executed in the first embodiment.
Figure 5B:
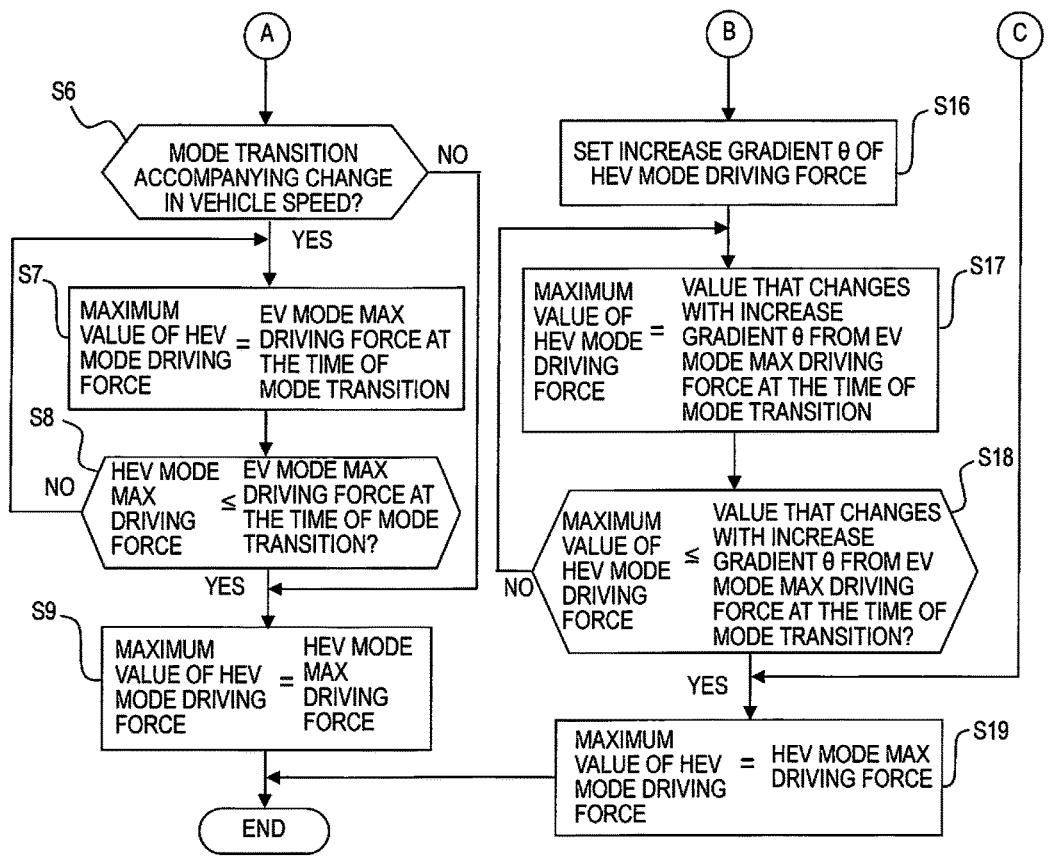
FIG. 5B is a flowchart illustrating the flow of the driving force control process (Step S6-Step S9, Step S16-Step S19) that is executed in the first embodiment.

FIG. 5A and FIG. 5B are flowcharts illustrating the flow of the driving force control process that is executed in the first embodiment. Each of the steps in FIG. 5A and FIG. 5B, which show one example of the driving force control process, will be described below.

In Step S1, it is determined whether or not the remaining charging amount of the high-power battery 3 (battery SOC) is equal to or greater than an SOC threshold value that is set in advance. In the case of YES (battery SOC≥SOC threshold value), the process proceeds to Step S2, and if NO (battery SOC<SOC threshold value), the process proceeds to Step S10. Here, the battery SOC is detected by a battery SOC sensor 78. In addition, the "SOC threshold value" is a threshold value for determining whether or not to prioritize the charging operation of the high-power battery 3 over the driving force, and is arbitrarily set.

Figure 6:
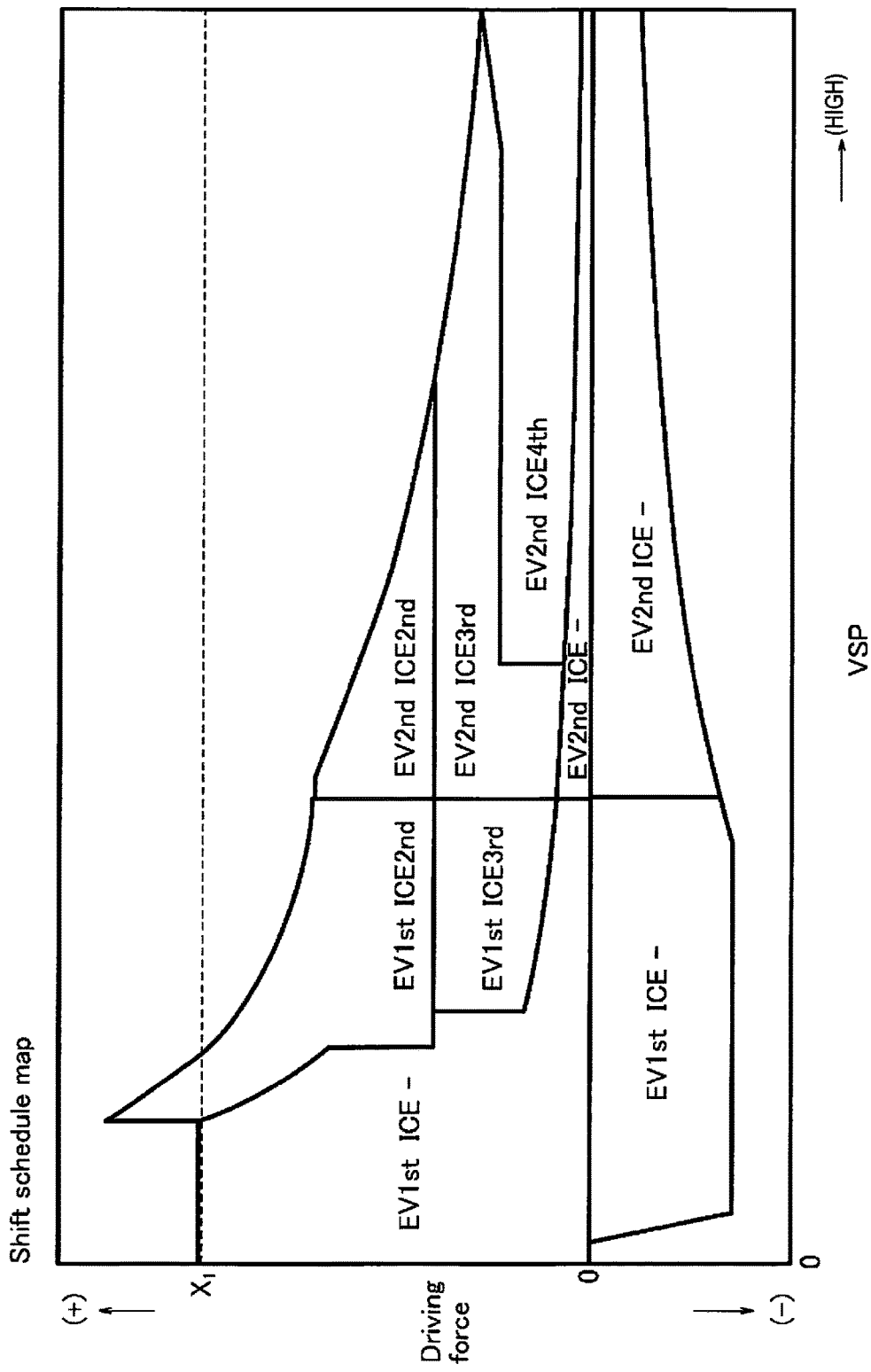
FIG. 6 is one example of the shifting map used at the time of high SOC in the first embodiment.

In Step S2, following the determination that battery SOC≥SOC threshold value in Step S1, it is determined that the battery SOC is sufficiently secured, the shifting map to be used in the motor control unit 22 is set to the "shifting map during high SOC" illustrated in FIG. 6, and the process proceeds to Step S3. Here, the "shifting map" is a map in which the vehicle speed (VSP) and the required braking/driving force (driving force) are the coordinate axes, on the coordinate plane of which are assigned selection regions for the multiple gear shift stages that constitute the normal use gear shift stage group. The motor control unit 22 determines the gear shift stage of the multistage gear transmission 1, based on the position of the operating point on this shifting map. Then, in the "shifting map during high SOC," the selection region of "EV1st ICE-" is assigned to the low vehicle speed region after starting, and the selection regions of "EV 2nd ICE-" "EV1st ICE2nd," "EV1st ICE3rd," "EV2nd ICE2nd," "EV2nd ICE3rd," and "EV 2nd ICE4th" are assigned to the intermediate to high vehicle speed region, as the drive driving region according to an accelerator depression. In addition, as regenerative braking regions with the foot away from the accelerator or depression of the brake, the selection region of "EV1st ICE-" is assigned to the low vehicle speed region, and the selection region of "EV2nd ICE-" is assigned to the intermediate to high vehicle speed region. The line segment that divides each of the selection regions in the drive driving region indicates the maximum driving force that can be output by the traveling drive source (maximum outputable driving force), in each of the selection regions. Additionally, the line segment that divides each of the selection regions in the regenerative braking region indicates the maximum driving force that can be output by the traveling drive source (maximum outputable driving force), in each of the selection regions.

In Step S3, following the setting of the "shifting map during high SOC" in Step S2, the accelerator position opening amount is read and the process proceeds to Step S4. Here, the accelerator position opening amount is a parameter representing the required driving force of the driver, and is detected by an accelerator position opening amount sensor 72.

In Step S4, following the reading of the accelerator position opening amount in Step S3, the vehicle speed is read and the process proceeds to Step S5. Here, the vehicle speed is detected by a vehicle speed sensor 71.

In Step S5, following the reading of the vehicle speed in Step S4, it is determined whether or not a mode transition request to switch from the EV mode to the HEV mode has been output. In the case of YES (mode transition request present), the process proceeds to Step S6, and if NO (mode transition request absent), the process returns to Step S3. Here, a mode transition request to switch from the EV mode to the HEV mode is output when an operating point, which is determined from the accelerator position opening amount read in Step S3 and the vehicle speed read in Step S4, has moved from the selection region of "EV1st ICE-" to the selection region of "EV1st ICE2nd," or to the selection region of "EV1st ICE3rd", on the "shifting map during high SOC" set in Step S2.

In Step S6, following the determination that a mode transition request is present in Step S5, it is determined whether or not the mode transition determined to be requested in Step S5 is based on a mode transition request accompanying a change (increase) in the vehicle speed. In the case of YES (change in vehicle speed: Auto Up), the process proceeds to Step S7, and if NO (change in required driving force: depression Down), the process proceeds to Step S9. Here, a "mode transition request accompanying a change (increase) in the vehicle speed" means that the operating point moves from the selection region of "EV1st ICE-" to the selection region of "EV1st ICE2nd," or to the selection region of "EV1st ICE3rd" with an increase in the vehicle speed, even if the required driving force of the driver is in a constant state (including fluctuation within a predetermined range). At this time, the driver is maintaining the accelerator position opening amount substantially constant, and the sensitivity to shock becomes high.

In Step S7, following the determination of a mode transition request accompanying a change in the vehicle speed in Step S6, the maximum value of the driving force in the HEV mode (EV1st ICE2nd) is set to a value that is equivalent to the maximum outputable driving force (MAX driving force) in the EV mode (EV1st ICE-) at the time of a mode transition. Here, the "driving force in the HEV mode" is the driving force that is transmitted from the traveling drive sources (first motor/generator MG1 and internal combustion engine ICE) to the drive wheels 19, when in the HEV mode. That is, the driving force is the total torque obtained by adding the output torque of the internal combustion engine ICE (ICE torque) to the output torque of the first motor/generator MG1 (MG1 torque). On the other hand, the "maximum outputable driving force in the EV mode" is the driving force that is generated by the maximum torque that can be set in the traveling drive source (first motor/generator MG1), when in the EV mode. The "maximum outputable driving force in the EV mode at the time of a mode transition" is the maximum driving force on the boundary line between the EV mode and the HEV mode, which is indicated by X1 in FIG. 6. That is, "the maximum value of the driving force in the HEV mode is set to a value that is equivalent to the maximum outputable driving force in the EV mode at the time of a mode transition" means to limit the driving force when in the HEV mode in accordance with the maximum outputable driving force in the EV mode at the time of a mode transition. As a result, even if the ICE torque is added to the MG1 torque due to a mode transition to the HEV mode, the upper limit of the driving force that is transmitted to the drive wheels 19 is limited.

In Step S8, following the setting of the driving force in the HEV mode in Step S7, it is determined whether or not the maximum outputable driving force (MAX driving force) in the HEV mode has become equal to or less than the maximum outputable driving force (MAX driving force) in the EV mode at the time of a mode transition. In the case of YES (HEV mode MAX driving force≤EV mode MAX driving force), the process proceeds to Step S9, and if NO (HEV mode MAX driving force>EV mode MAX driving force), the process returns to Step S7. Here, the "maximum outputable driving force in the HEV mode" is the driving force that is generated by the maximum torque that can be set in the traveling drive sources (first motor/generator MG1 and internal combustion engine ICE), when in the HEV mode. This "maximum outputable driving force in the HEV mode" is a value that differs according to the vehicle speed, so the maximum outputable driving force can become a different value depending on the vehicle speed, even when in the same "HEV mode."

In Step S9, following the determination of a mode transition request accompanying a change (increase) in the required driving force in Step S6, or a determination that HEV mode MAX driving force≤EV mode MAX driving force in Step S8, the maximum value of the driving force in the HEV mode is set to the maximum outputable driving force (MAX driving force) in the HEV mode, and the process proceeds to END. Here, a "mode transition request accompanying a change (increase) in the required driving force" means that the operating point moves from the selection region of "EV1st ICE-" to the selection region of "EV1st ICE2nd," or to the selection region of "EV1st ICE3rd" with an increase in the required driving force of the driver, even if the vehicle speed is in a constant state (including fluctuation within a predetermined range). At this time, the driver is depressing the accelerator pedal, so the sensitivity to shock becomes relatively low (the allowable mode transition shock is increased). When HEV mode MAX driving force becomes≤EV mode MAX driving force, even if the maximum torque that can be set by the traveling drive source is output, the value will fall below the level equivalent to the maximum outputable driving force in the EV mode at the time of a mode transition. That is, in this Step S9, it is determined that the required driving force of the driver is high and that the sensitivity to shock is low, or that the driving force transmitted to the drive wheels 19 will not abruptly increase even if the maximum torque that can be set by the traveling drive source is output, and the driving force in the HEV mode is not limited with respect to the maximum outputable driving force.

Figure 7:
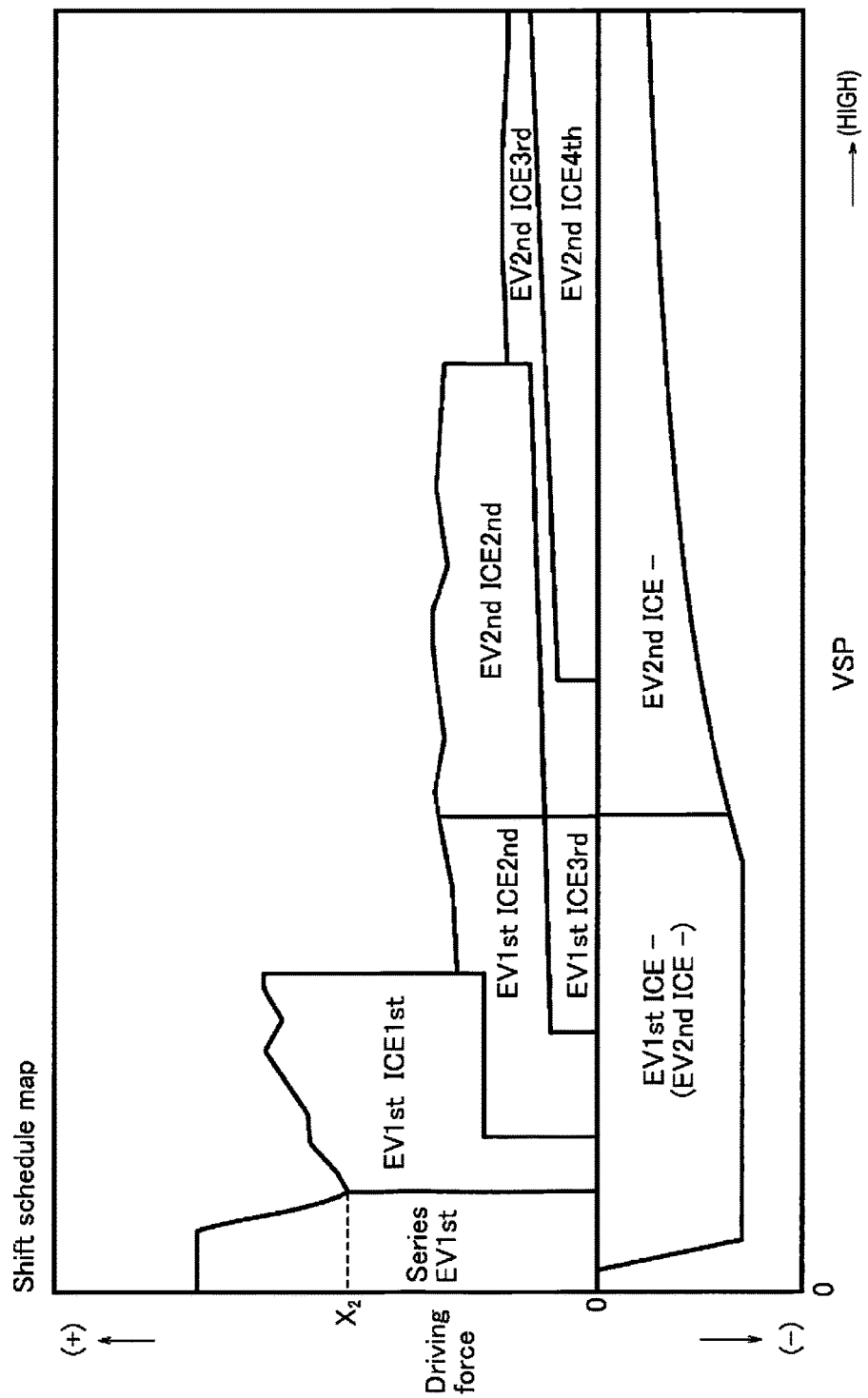
FIG. 7 is one example of the shifting map used at the time of low SOC in the first embodiment.

In Step S10, following the determination that SOC<SOC threshold value in Step S1, it is determined that the battery SOC is not secured and that charging should be prioritized, the shifting map to be used in the motor control unit 22 is set to the "shifting map during low SOC" illustrated in FIG. 7, and the process proceeds to Step S11. Here, compared with the "shifting map during high SOC" (FIG. 6), the "shifting map during low SOC" is a map in which "Series EV 1st (series EV mode in "EV1st ICE-")" and "EV1st ICE1st" are added to the drive driving region of the coordinate plane, while "EV2nd ICE-" is omitted, so as to suppress power consumption. That is, in the "shifting map during low SOC," a selection region of "Series EV 1st" is assigned to the low vehicle speed region after start, as a drive driving region by an accelerator depression. Then, the selection regions of "EV1st ICE1st," "EV1st ICE2nd," and "EV1st ICE3rd" are assigned to the intermediate vehicle speed region, and the selection regions of "EV2nd ICE2nd," "EV2nd ICE3rd," and "EV2nd ICE4th" are assigned to the high vehicle speed region. In addition, as regenerative braking regions with the foot away from the accelerator or depression of the brake, the selection region of "EV1st ICE- (EV2nd ICE-)" is assigned to the low vehicle speed region, and the selection region of "EV2nd ICE-" is assigned to the high vehicle speed region. The line segment that divides each of the selection regions in the drive driving region indicates the maximum driving force that can be output by the traveling drive source (maximum outputable driving force) in each of the selection regions. Additionally, the line segment that divides each of the selection regions in the regenerative braking region indicates the maximum driving force that can be output by the traveling drive source (maximum outputable driving force) in each of the selection regions.

In Step S11, following the setting of the "shifting map during low SOC" in Step S10, the accelerator position opening amount is read and the process proceeds to Step S12.

In Step S12, following the reading of the accelerator position opening amount in Step S11, the vehicle speed is read and the process proceeds to Step S13.

In Step S13, following the reading of the vehicle speed in Step S12, it is determined whether or not a mode transition request to switch from the EV mode to the HEV mode has been output. In the case of YES (mode transition request present), the process proceeds to Step S14, and if NO (mode transition request absent), the process returns to Step S11. Here, a mode transition request to switch from the EV mode to the HEV mode is output when an operating point, which is determined from the accelerator position opening amount read in Step S11 and the vehicle speed read in Step S12, has moved from the selection region of "Series EV1st" to the selection region of "EV1st ICE1st" on the "shifting map during low SOC" set in Step S10.

In Step S14, following the determination that a mode transition request is present in Step S13, it is determined whether or not the mode transition determined to be requested in Step S13 is based on a mode transition request accompanying a change (increase) in the vehicle speed. In the case of YES (change in vehicle speed: Auto Up), the process proceeds to Step S15, and if NO (change in required driving force: depression Down), the process proceeds to Step S19. Here, a "mode transition request accompanying a change (increase) in the vehicle speed" means that the operating point moves from the selection region of "Series EV1st" to the selection region of "EV1st ICE1st" with an increase in the vehicle speed, even if the required driving force of the driver is in a constant state (including fluctuation within a predetermined range).

In Step S15, following the determination of a mode transition request accompanying a change in the vehicle speed in Step S14, the battery SOC is read and the process proceeds to Step S16. Here, the battery SOC is detected by the battery SOC sensor 78.

Figure 8A:
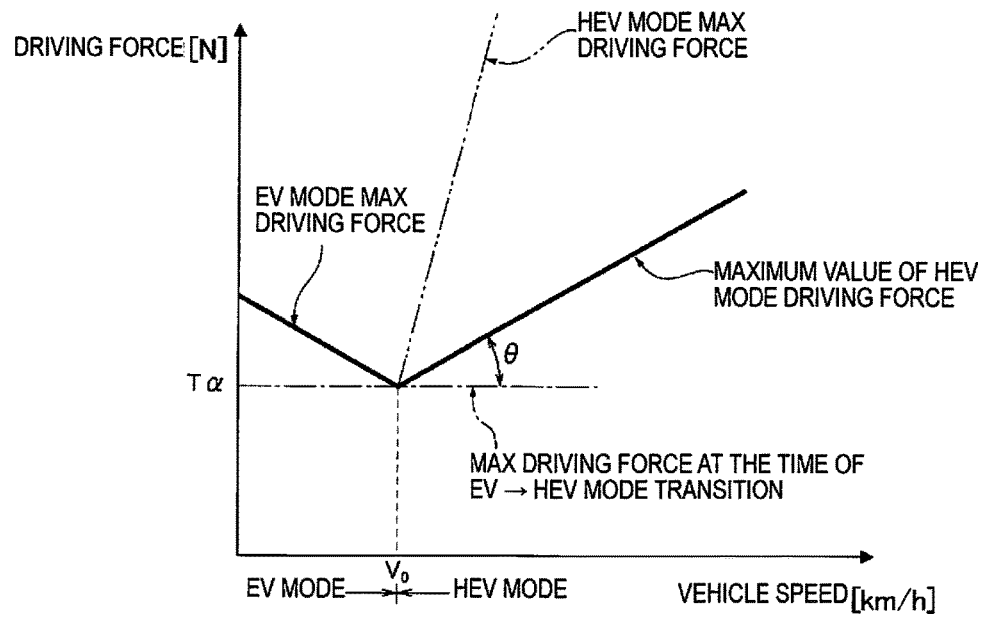
FIG. 8A is an explanatory view showing the maximum value of the driving force in the HEV mode, which changes according to the increase in gradient.

In Step S16, following the reading of the battery SOC in Step S15, an increase gradient θ of the driving force in the HEV mode is set based on the read battery SOC, and the process proceeds to Step S17. Here, the "increase gradient θ of the driving force in the HEV mode" is the gradient when the driving force in the HEV mode increases in accordance with an increase in the vehicle speed, with the maximum outputable driving force (MAX driving force) "Tα" at the point in time of a mode transition from the EV mode to the HEV mode (at the point in time of vehicle speed V0) as a reference, as illustrated in FIG. 8A. That is, a case in which the maximum value of the driving force in the HEV mode transitions on a line segment that becomes "Tα" as the vehicle speed increases is considered as increase gradient θ =zero. This increase gradient θ is set based on the battery SOC and the map illustrated in FIG. 8B, and the increase gradient θ becomes a higher value as the battery SOC is decreased. When increase gradient θ="max" is set, the maximum value of the driving force in the HEV mode is set to the maximum outputable driving force (MAX driving force) in the HEV mode.

In Step S17, following the setting of the increase gradient θ in Step S16, the maximum value of the driving force in the HEV mode (EV1st ICE1 st) is set to a value that changes (increases) from the maximum outputable driving force (MAX driving force) in the EV mode (Series EV1st) at the time of a mode transition with the increase gradient θ set in Step S16, in accordance with the increase in the vehicle speed, and the process proceeds to Step S18. Here, the "maximum outputable driving force in the EV mode at the time of a mode transition" is the maximum driving force on the boundary line between the EV mode and the HEV mode, which is indicated by X2 in FIG. 7. That is, "the maximum value of the driving force in the HEV mode is set to a value that increases from the maximum outputable driving force in the EV mode at the time of a mode transition with the increase gradient θ" means to limit the driving force when in the HEV mode in accordance with the maximum outputable driving force in the EV mode at the time of a mode transition, and to vary the limiting amount based on the battery SOC. As a result, the upper limit of the driving force that is transmitted to the drive wheels 19 in the HEV mode is increased as the battery SOC is decreased.

In Step S18, following the setting of the driving force in the HEV mode in Step S17, it is determined whether or not the maximum outputable driving force (MAX driving force) in the HEV mode has become equal to or less than a value that changes with the increase gradient θ in accordance with the increase in the vehicle speed, from the maximum outputable driving force in the EV mode at the time of a mode transition. In the case of YES (HEV mode MAX driving force≤value that changes with increase gradient θ), the process proceeds to Step S19, and if NO (HEV mode MAX driving force>value that changes with increase gradient θ), the process returns to Step S17.

In Step S19, following the determination of a mode transition request accompanying a change (increase) in the required driving force in Step S14, or a determination that HEV mode MAX driving force≤value that changes with increase gradient θ in Step S18, the maximum value of the driving force in the HEV mode is set to the maximum outputable driving force (MAX driving force) in the HEV mode, and the process proceeds to END.

Next, the actions are described. First, the Problems of a hybrid vehicle that does not have a differential rotation absorbing element in the drive system will be described; then, the Action of limiting the driving force at the time of high SOC, Action of not limiting the driving force at the time of high SOC, and Action of limiting the driving force at the time of low SOC will be separately described, regarding the actions of the driving force control device for a hybrid vehicle of the first embodiment.

Problems of a Hybrid Vehicle that does not have a Differential Rotation Absorbing Element in the Drive System A differential rotation absorbing element is a power transmission element that is capable of torque transmission, even if differential rotation is being generated between the input side rotary element and the output side rotary element, such as a friction clutch or a torque converter. In this differential rotation absorbing element, it is possible to absorb fluctuations in the driving force that is transmitted to the input side rotary element, by gradually increasing the engagement torque in a state in which the output side rotary element is slipped with respect to the input side rotary element.

That is, in the case of a hybrid vehicle provided with an electric motor and an internal combustion engine serving as traveling drive sources, and having a differential rotation absorbing element in the drive system from the traveling drive sources to the drive wheels, it is possible to absorb fluctuations in the driving force with the differential rotation absorbing element, even if the output torque of the internal combustion engine (engine torque) is added to the output torque of the electric motor (motor torque) due to a mode transition from the EV mode to the HEV mode, and the driving force that is output from the traveling drive sources is suddenly increased. As a result, fluctuations in the driving force that is transmitted to the drive wheels are suppressed, and mode transition shock can be suppressed.

In contrast, in a vehicle that does not have a differential rotation absorbing element in the drive system, the driving force that is output from the traveling drive source is transmitted to the drive wheels as is. That is, in a hybrid vehicle that does not have a differential rotation absorbing element in the drive system, if the engine torque is added to the motor torque at the time of a mode transition from the EV mode to the HEV mode and the driving force that is output from the traveling drive source is suddenly increased, the fluctuations in the driving force are transmitted to the drive wheels. Consequently, a problem arises in that the driving force that is transmitted to the drive wheels fluctuates and generates mode transition shock.

On the other hand, it is known that the driver's sensitivity to shock (how easily shock is felt) with respect to a mode transition shock differs depending on the traveling situation. That is, at the time of a mode transition from the EV mode to the HEV mode according to an increase in the required driving force of the driver, the driver is desiring an increase in the driving force. Accordingly, the sensitivity to shock becomes relatively low, and the allowable (does not experience discomfort) mode transition shock is increased. However, when there is a mode transition from the EV mode to the HEV mode accompanying an increase in the vehicle speed in a state in which the required driving force of the driver is substantially constant, the driver is not desiring an increase in the driving force. Consequently, the sensitivity to shock becomes relatively high, and even a slight shock (driving force fluctuation) tends to cause discomfort.

Accordingly, in a hybrid vehicle that does not have a differential rotation absorbing element in the drive system and in which changes in the driving force are directly transmitted to the drive wheels, if the driver's sensitivity to shock is high, it is necessary to suppress the mode transition shock.

Action of Limiting the Driving Force at the Time of High SOC

Figure 9:
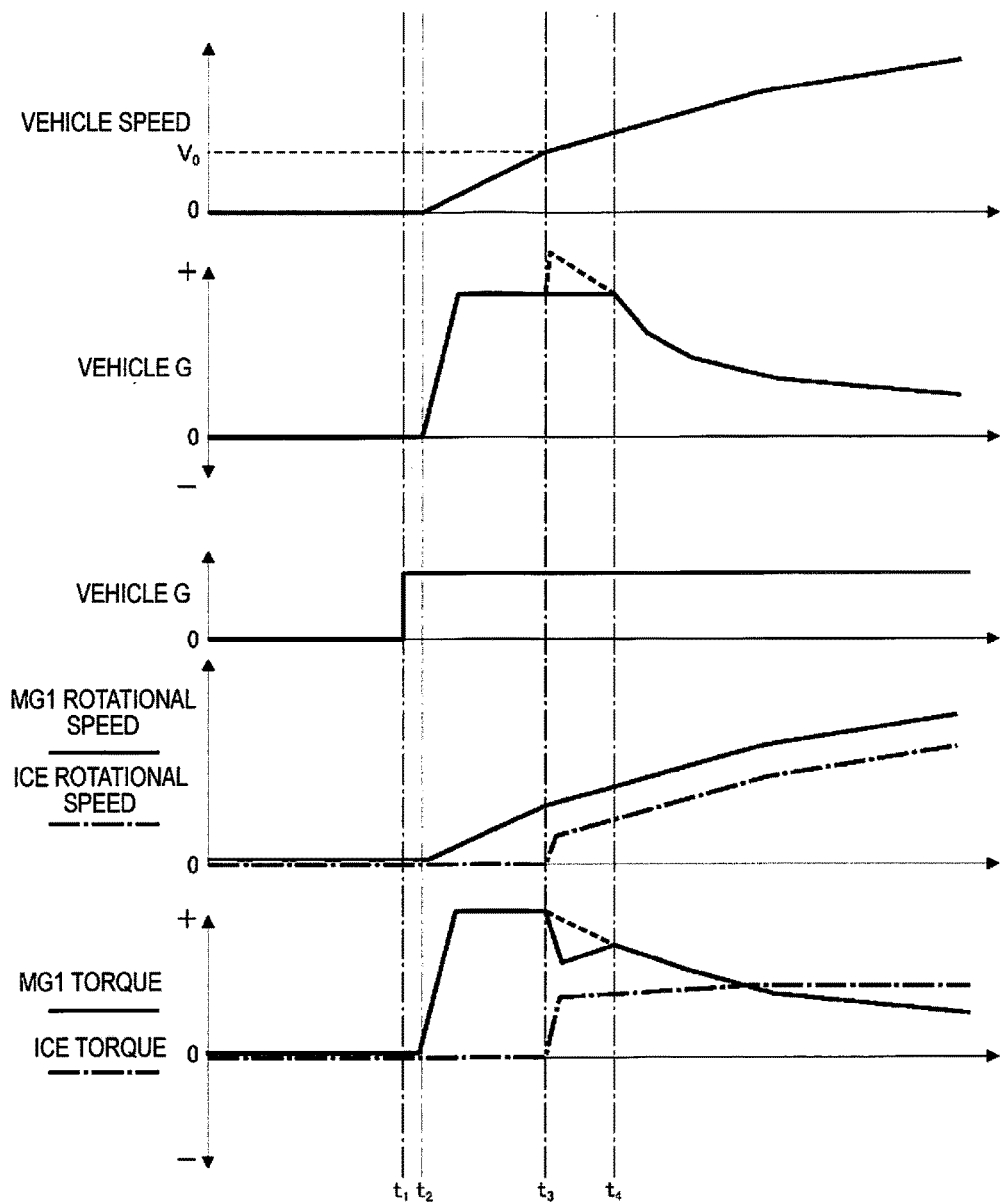
FIG. 9 is a time chart illustrating each of the characteristics of the vehicle speed/vehicle G/accelerator position opening amount/MG1 rotational speed/ICE rotational speed/MG1 torque/ICE torque, when the mode transitions from EV→HEV accompanying a change in the vehicle speed at the time of high SOC, in the first embodiment.

FIG. 9 is a time chart illustrating each of the characteristics of the vehicle speed/vehicle G/accelerator position opening amount/MG1 rotational speed/ICE rotational speed, when the mode transitions from EV→HEV accompanying a change in the vehicle speed at the time of high SOC, in the first embodiment. The action of limiting the driving force at the time of high SOC will be described below, based on the flowcharts illustrated in FIGS. 5A and 5B, and the time chart illustrated in FIG. 9. "Vehicle G" is the acceleration that acts on the vehicle body, and is a value indicating the driving force that is transmitted from the traveling drive source to the drive wheels 19. "MG1 rotational speed" is the output rotational speed of the first motor/generator MG1. "ICE rotational speed" is the output rotational speed of the internal combustion engine ICE. "MG1 torque" is the output torque of the first motor/generator MG1. "ICE torque" is the output torque of the internal combustion engine ICE. In "Vehicle G," the positive side indicates acceleration (driving force) and the negative side indicates deceleration (braking force). In "MG1 torque," the positive side indicates the drive torque and the negative side indicates the regenerative torque. In "ICE torque," the positive side indicates the drive torque and the negative side indicates the power generation torque (torque for generating power in the second motor/generator MG2).

In the hybrid vehicle of the first embodiment, a stopped state in which both the first motor/generator MG1 and the internal combustion engine ICE are stopped, in a state in which the battery SOC is relatively high (equal to or greater than the SOC threshold value), will be considered. At this time, the process proceeds from Step S1→Step S2 in the flowchart shown in FIG. 5A, and the "shifting map during high SOC" illustrated in FIG. 6 is set as the shifting map. Then, the process proceeds from Step S3→Step S4→Step S5. Before time $t_1$ as shown in FIG. 9, the accelerator position opening amount and the vehicle speed are both zero. Accordingly, the operating point exists at position P on the shifting map, as illustrated in FIG. 10, so the "EV1st ICE-" gear shift stage may be selected, in which, in the multistage gear transmission 1, all of the first, second, and third engagement clutches C1, C2, C3 are set to "Neutral," or the first and second engagement clutches C1, C2 are set to "Neutral" while the third engagement clutch C3 is set to "Left." In addition, since the operating point does not move, a mode transition request from the EV mode to the HEV mode is not output, and the flow of Step S3→Step S4→Step S5 is repeated.

The accelerator pedal is depressed and the accelerator position opening amount is increased at time $t_1$. At this time, the required driving force of the driver reflected in the accelerator position opening amount shall be the magnitude indicated by the broken line in FIG. 10.

Figure 11A:
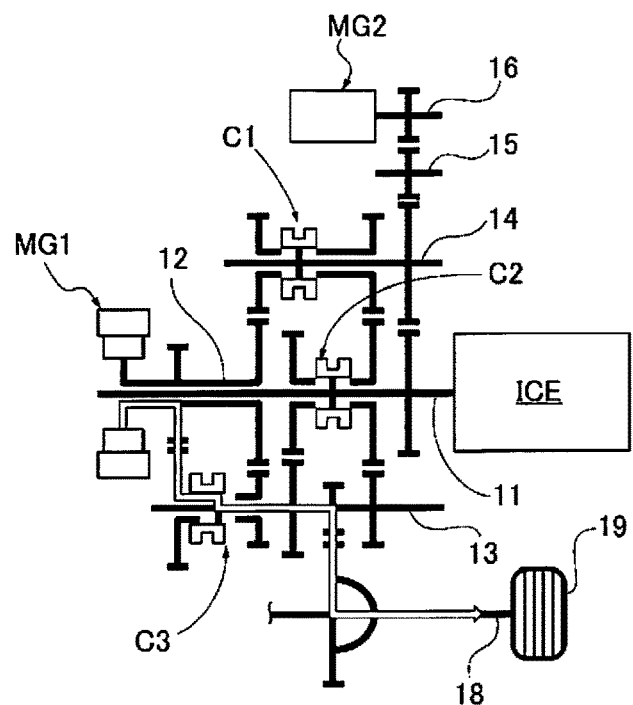
FIG. 11A is an explanatory view illustrating the power transmission route in the EV mode at the time of high SOC.

Then, as the accelerator pedal is depressed and a required driving force of the driver is generated, the operating point on the shifting map moves from position P to position $P_1$. As a result, the gear shift stage of the multistage gear transmission 1 is set to "EV1st ICE-" and the third engagement clutch C3 is set to "Left," while the first motor/generator MG1 is driven. As a result, MG1 torque is generated and the MG1 rotational speed increases from time $t_2$. Accordingly, acceleration acts on the vehicle body to generate a vehicle G, and the vehicle speed starts to rise. Here, the magnitude of the vehicle G is proportional to the MG1 torque. On the other hand, the value of the vehicle speed is proportional to the MG1 rotational speed. In addition, the drive power transmission path at this time is connected from the first motor/generator MG1→second shaft 12→third engagement clutch C3→third shaft 13→drive shaft 18→drive wheels 19, as illustrated in FIG. 11. That is, only the MG1 torque from the first motor/generator MG1 will be transmitted to the drive wheels 19.

Figure 10:
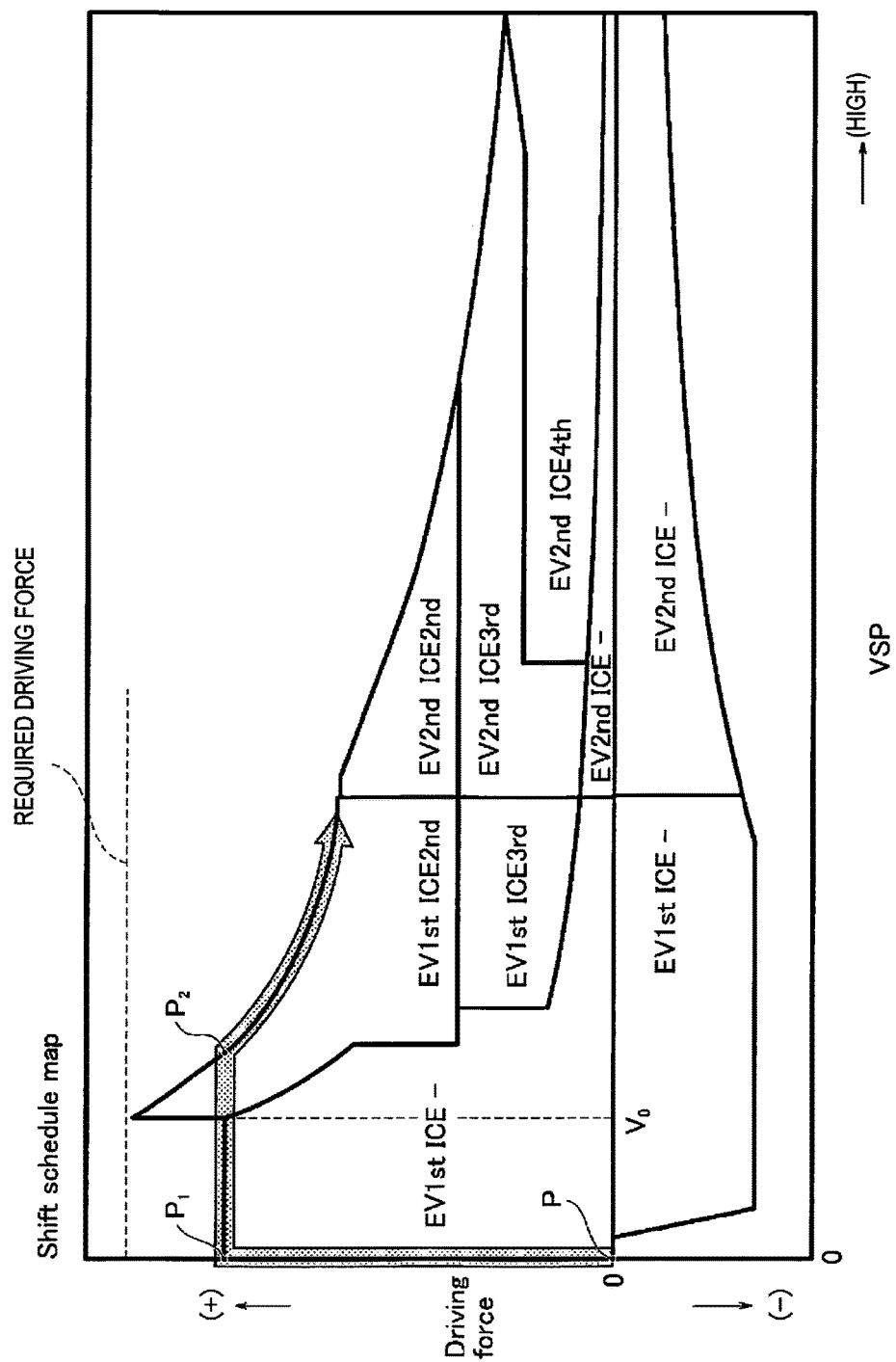
FIG. 10 is an explanatory view illustrating the movement trajectory of the operating point on a shifting map, when the mode transitions from EV→HEV accompanying a change in the vehicle speed at the time of high SOC.

Then, when the vehicle speed increases, the operating point on the shifting map illustrated in FIG. 10 will also move, accompanying this increase in the vehicle speed. At this time, the accelerator position opening amount is maintained at a constant value, and the required driving force of the driver also maintains the value indicated by the broken line. Accordingly, since the maximum outputable driving force is lower than the required driving force, the operating point will move from position $P_1$ to the right side on the line segment indicating the maximum outputable driving force, in accordance with the increase in the vehicle speed, as illustrated by the arrow in FIG. 10.

Figure 11B:
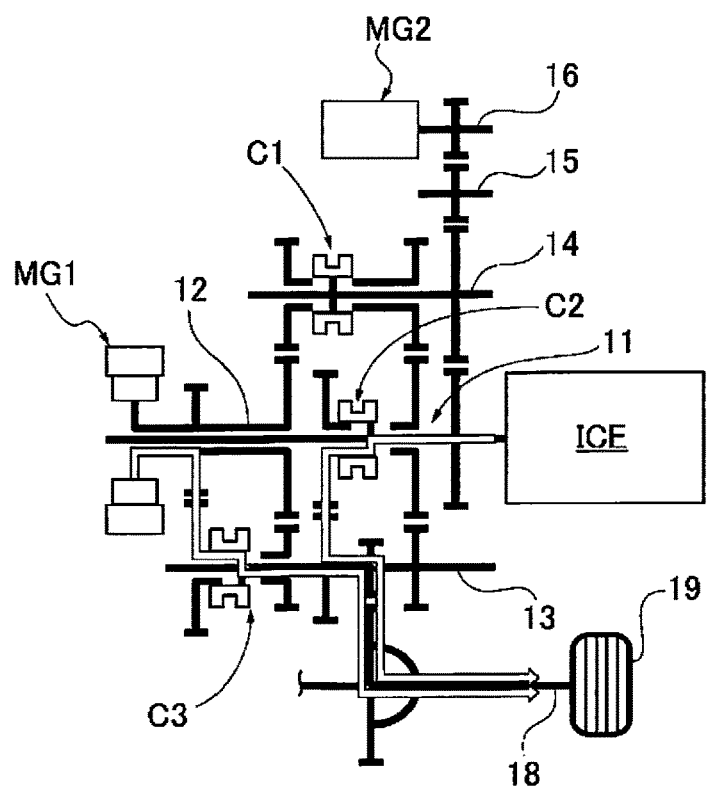
FIG. 11B is an explanatory view illustrating the power transmission route in the HEV mode at the time of high SOC.

When the vehicle speed exceeds $V_0$ at time $t_3$, the operating point on the shifting map illustrated in FIG. 10 moves from the selection region of "EV1st ICE-" to the selection region of "EV1st ICE2nd." As a result, a mode transition request from the EV mode to the HEV mode is output. That is, the gear shift stage of the multistage gear transmission 1 is set to "EV1st ICE2nd" and the second engagement clutch C2 is set to "Left," while the internal combustion engine ICE is started by the second motor/generator MG2. In addition, the drive power transmission path at this time becomes a path that is connected from the first motor/generator MG1→second shaft 12→third engagement clutch C3→third shaft 13→drive shaft 18→drive wheels 19, and a path that is connected from the internal combustion engine ICE→first shaft 11→second engagement clutch C2→third shaft 13→drive shaft 18→drive wheels 19, as illustrated in FIG. 11B. That is, the MG1 torque from the first motor/generator MG1 and the ICE torque from the internal combustion engine ICE will be transmitted to the drive wheels 19.

On the other hand, in the flowcharts illustrated in FIGS. 5A and 5B, the process proceeds from Step S5→Step S6, and it is determined whether or not the mode transition request at time t3 is a request accompanying a change in the vehicle speed. Here, the accelerator position opening amount is maintaining a constant value from time $t_1$. In addition, the vehicle speed is continuing to rise from time $t_2$. That is, this mode transition request at time t3 is a request accompanying a change in the vehicle speed. Accordingly, the process proceeds to Step S6→Step S7, and the maximum value of the driving force in the HEV mode is set to a value that is equivalent to the maximum outputable driving force in the EV mode (EV1st ICE-) at the time of a mode transition.

Here, in "EV1st ICE2nd," which is the HEV mode, the maximum driving force that can be output by the traveling drive sources (maximum outputable driving force) is greatly increased by the ICE torque being added to the MG1 torque, compared to when in "EV1st ICE-," which is the EV mode, as illustrated in FIG. 10. In contrast, by setting the maximum value of the driving force in the HEV mode to a value that is equivalent to the maximum outputable driving force in the EV mode (EV1st ICE-) at the time of a mode transition, the driving force that is transmitted to the drive wheels 19 is limited even if the required driving force is high. That is, regardless of the required driving force, an operating point that enters the selection region of "EV1st ICE2nd" on the shifting map illustrated in FIG. 10 will move on the line segment indicated by the arrow toward the right side, accompanying the increase in the vehicle speed.

That is, when the internal combustion engine ICE is started and ICE torque is generated, the MG1 torque is reduced by the same magnitude as the generated ICE torque in the first motor/generator MG1, to suppress an increase in the vehicle G, as illustrated in FIG. 9. It is thereby possible to suppress fluctuation in the vehicle G at the time of a mode transition from the EV mode to the HEV mode. Then, it is possible to make the mode transition shock less likely to be experienced, even if the mode transition is accompanying a change in the vehicle speed, and the driver's sensitivity to shock is high. That is, it is possible to carry out a mode transition without imparting discomfort to the driver.

In the event MG1 torque is not reduced at the time of a mode transition from the EV mode to the HEV mode without limiting the maximum value of the driving force in the HEV mode, the vehicle G, which is the driving force that is transmitted to the drive wheels 19, will suddenly increase by the amount of the ICE torque, at the time $t_3$ of the mode transition, as illustrated by the broken line in FIG. 9. Consequently, the driver will experience mode transition shock even though the driver has not depressed the accelerator pedal, and will experience discomfort.

Thereafter, the maximum outputable driving force in the HEV mode decreases as the maximum outputable driving force of the first motor/generator MG1 decreases accompanying an increase in the vehicle speed (refer to FIG. 10). Then, at time t4, the maximum outputable driving force in the HEV mode becomes equal to or less than the maximum outputable driving force in the EV mode (EV1st ICE-) at the time of a mode transition. That is, the operating point moves to position $P_2$ on the shifting map illustrated in FIG. 10.

Accordingly, the process proceeds from Step S8→Step S9, and the maximum value of the driving force in the HEV mode is set to the maximum outputable driving force in the HEV mode. That is, after time $t_a$, the operating point will move from position $P_2$ to the right side on the line segment indicating the maximum outputable driving force, accompanying the increase in the vehicle speed, as illustrated by the arrow in FIG. 10. It is thereby possible to end the suppression control of the MG1 torque, while suppressing large fluctuations in the vehicle G, which is the driving force that is transmitted to the drive wheels 19.

Action of not Limiting the Driving Force at the Time of High SOC

Figure 12:
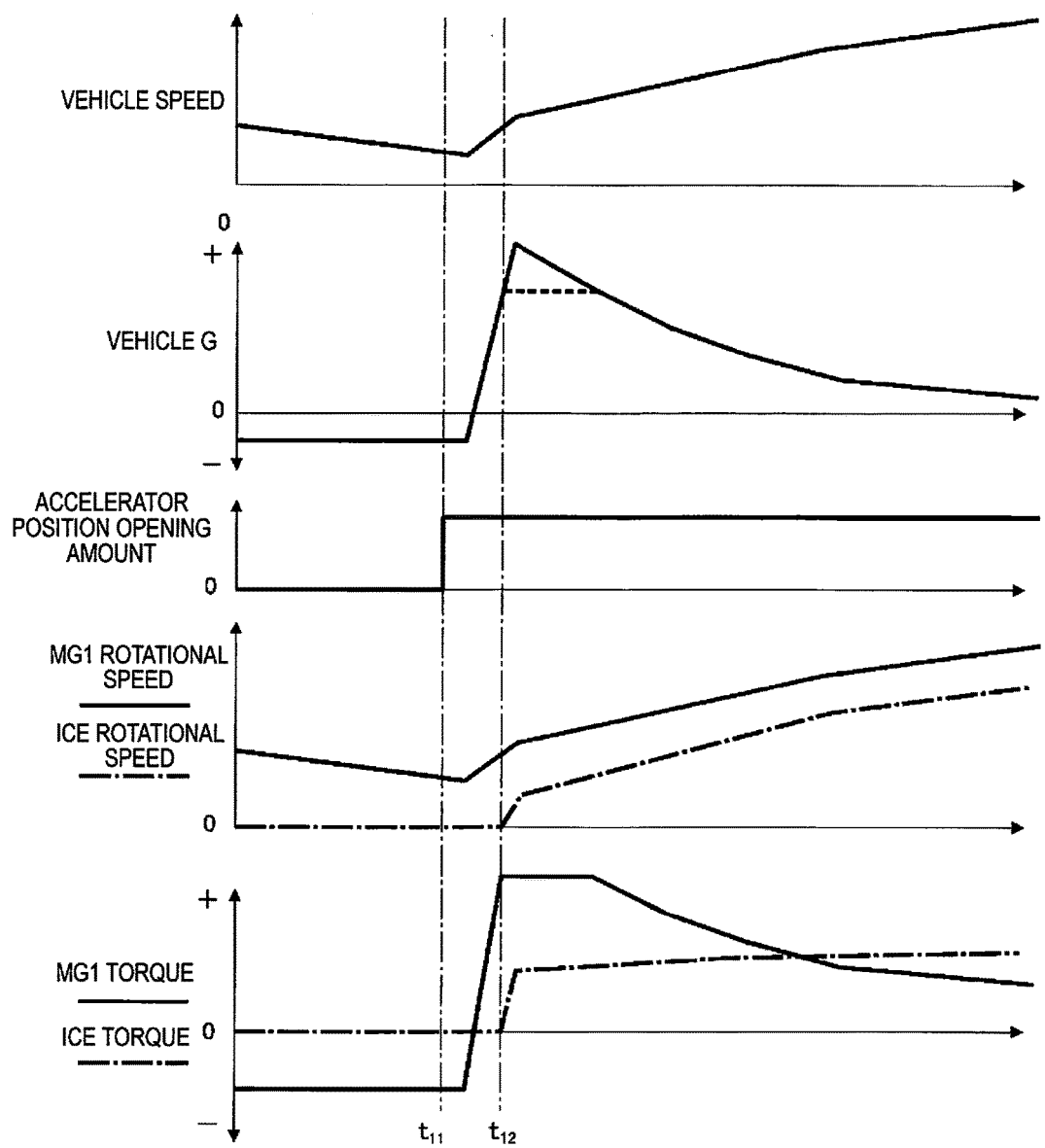
FIG. 12 is a time chart illustrating each of the characteristics of the vehicle speed/vehicle G/accelerator position opening amount/MG1 rotational speed/ICE rotational speed/MG1 torque/ICE torque, when the mode transitions from EV→HEV accompanying a change in the required driving force of the driver at the time of high SOC, in the first embodiment.

FIG. 12 is a time chart illustrating each of the characteristics of the vehicle speed/vehicle G/accelerator position opening amount/MG1 rotational speed/ICE rotational speed, when the mode transitions from EV→HEV accompanying a change in the required driving force at the time of high SOC, in the first embodiment. The action of not limiting the driving force at the time of high SOC will be described below, based on the flowcharts illustrated in FIGS. 5A and 5B, and the time chart illustrated in FIG. 12. The "vehicle G," the "MG1 rotational speed," the "ICE rotational speed," the "MG1 torque," and the "ICE torque" are the same as in FIG. 9.

Figure 13:
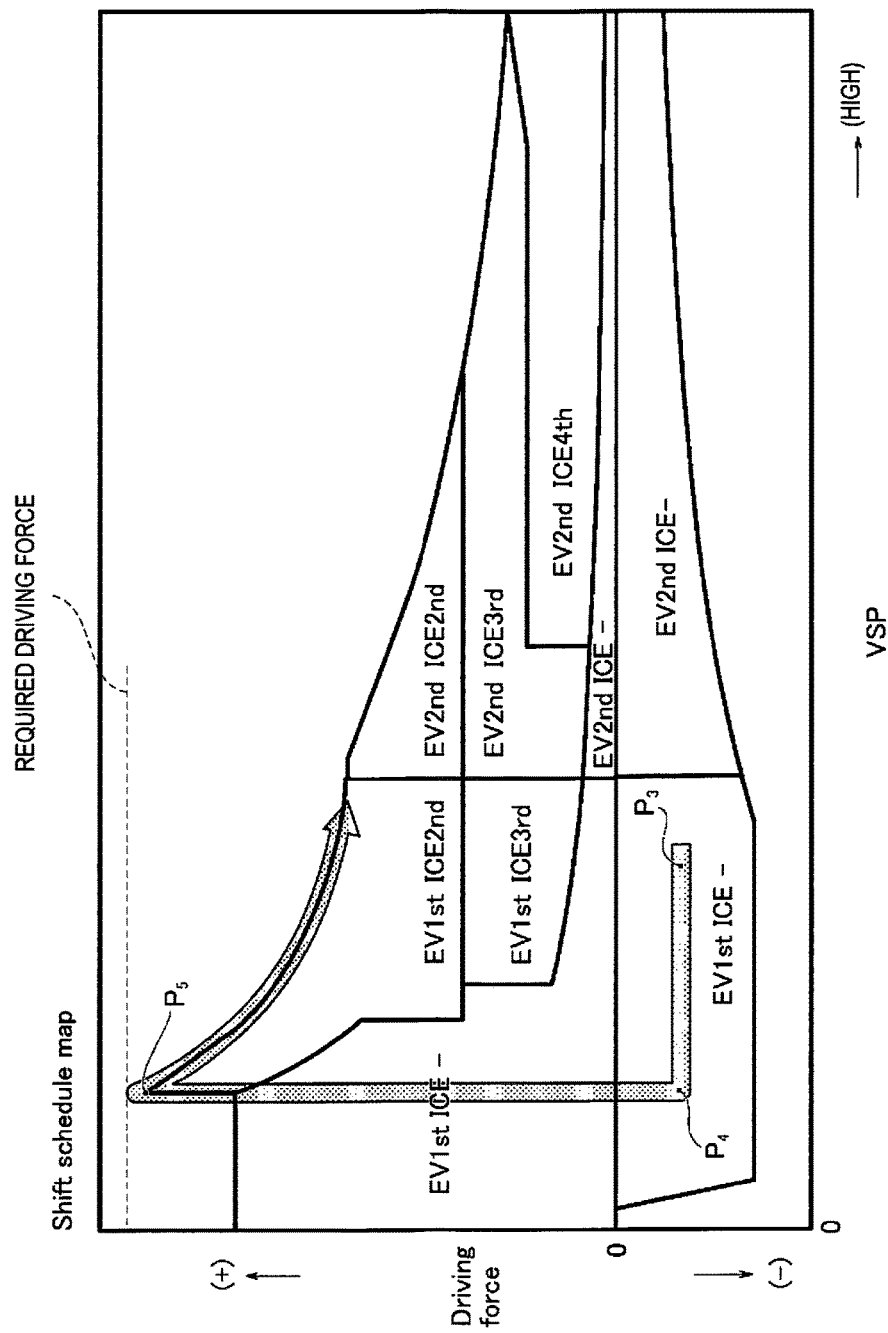
FIG. 13 is an explanatory view illustrating the movement trajectory of the operating point on a shifting map, when the mode transitions from EV→HEV accompanying a change in the required driving force of the driver at the time of high SOC.

In the hybrid vehicle of the first embodiment, a state in which coasting regenerative traveling is being carried out by an accelerator foot release operation, in a state in which the battery SOC is relatively high (equal to or greater than the SOC threshold value), will be considered. At this time, the process proceeds from Step S1→Step S2 in the flowchart shown in FIG. 5A, and the "shifting map during high SOC" illustrated in FIG. 6 is selected as the shifting map. Then, the process proceeds from Step S3→Step S4 Step S5. Before time $t_{11}$ as shown in FIG. 12, a vehicle speed is generated but the accelerator pedal is not depressed. Accordingly, the operating point exists at position $P_3$ on the shifting map, as illustrated in FIG. 13, so the gear shift stage of the multistage gear transmission 1 is set to "EV1st ICE-", and the third engagement clutch C3 is set to "Left." The first motor/generator MG1 carries out regeneration. By the first motor/generator MG1 carrying out regeneration, a regenerative braking force is generated causing deceleration to act on the vehicle body, and the vehicle speed is decreased. That is, the operating point on the shifting map gradually moves from position $P_3$ toward the left side along the arrow as shown in FIG. 13, accompanying a decrease in the vehicle speed. Since the operating point moves within the selection region of "EV1st ICE-", a mode transition request from the EV mode to the HEV mode is not output, and the flow of Step S3→Step S4→Step S5 is repeated.

When the accelerator pedal is depressed at time $t_{11}$, the accelerator position opening amount is increased. At this time, the required driving force of the driver reflected in the accelerator position opening amount shall be the magnitude indicated by the broken line in FIG. 13.

Then, as the accelerator pedal is depressed and a required driving force of the driver is generated, the operating point on the shift map that had moved to position $P_4$ rises along the arrow from position $P_4$, and moves from the selection region of "EV1st ICE-" to the selection region of "EV1st ICE2nd." As a result, a mode transition request from the EV mode to the HEV mode is output. As a result, the gear shift stage of the multistage gear transmission 1 is set to "EV1st ICE2nd" and the second engagement clutch C2 is set to "Left." In addition, the first motor/generator MG1 switches from regeneration to driving, and the internal combustion engine ICE is started by the second motor/generator MG2.

On the other hand, in the flowcharts illustrated in FIGS. 5A and 5B, the process proceeds from Step S5→Step S6, and it is determined whether or not the mode transition request at time $t_{11}$ is a request accompanying a change in the vehicle speed. Here, the accelerator position opening amount is increased at time $t_{11}$, and the mode transition request at this time $t_{11}$ will be a request accompanying a change in the required driving force of the driver. Accordingly, the process proceeds from Step S6→Step S9, and the maximum value of the driving force in the HEV mode is set to the maximum outputable driving force (MAX driving force) in the HEV mode.

As a result, the maximum value of the driving force is not limited in the HEV mode, and it becomes possible to output to the maximum driving force. That is, the operating point that enters the selection region of "EV1st ICE2nd" moves on the line segment indicating the maximum outputable driving force to position $P_5$, as indicated by the arrow in FIG. 13.

Accordingly, at time $t_{12}$, when the internal combustion engine ICE is started and an ICE torque is generated, the ICE torque is added on top of the MG1 torque, and the vehicle G is further increased, as illustrated in FIG. 12. As a result, it is possible to achieve an increase in the driving force that is transmitted to the drive wheels 19 by a mode transition from the EV mode to the HEV mode, and to promptly respond to the required driving force of the driver. In addition, fluctuation in the vehicle G accompanying a mode transition does occur by not limiting the maximum value of the driving force in the HEV mode. However, since the driver is depressing the accelerator pedal, sensitivity to shock is relatively low, and since the first motor/generator MG1 is switched from a regenerative state to a driving state, the vehicle G is in a rising state immediately before the mode transition, as illustrated in FIG. 12. Accordingly, the driver is less likely to experience discomfort with respect to the mode transition shock and can allow the mode transition shock.

If the maximum value of the driving force in the HEV mode is limited to, for example, the maximum outputable driving force in the EV mode (EV1st ICE-) at the time of a mode transition, an increase in the vehicle G, which is the driving force that is transmitted to the drive wheels 19, is suppressed as indicated by the broken line in FIG. 9, at the time of a mode transition from the EV mode to the HEV mode. Consequently, while the mode transition shock is reduced, the required driving force of the driver and the driving force that is transmitted to the drive wheels 19 will diverge greatly. As a result, the driver will not experience an increase in the driving force as a sensation, even though the driver is depressing the accelerator pedal, and will experience discomfort.

Action of Limiting the Driving Force at the Time of Low SOC

Figure 14:
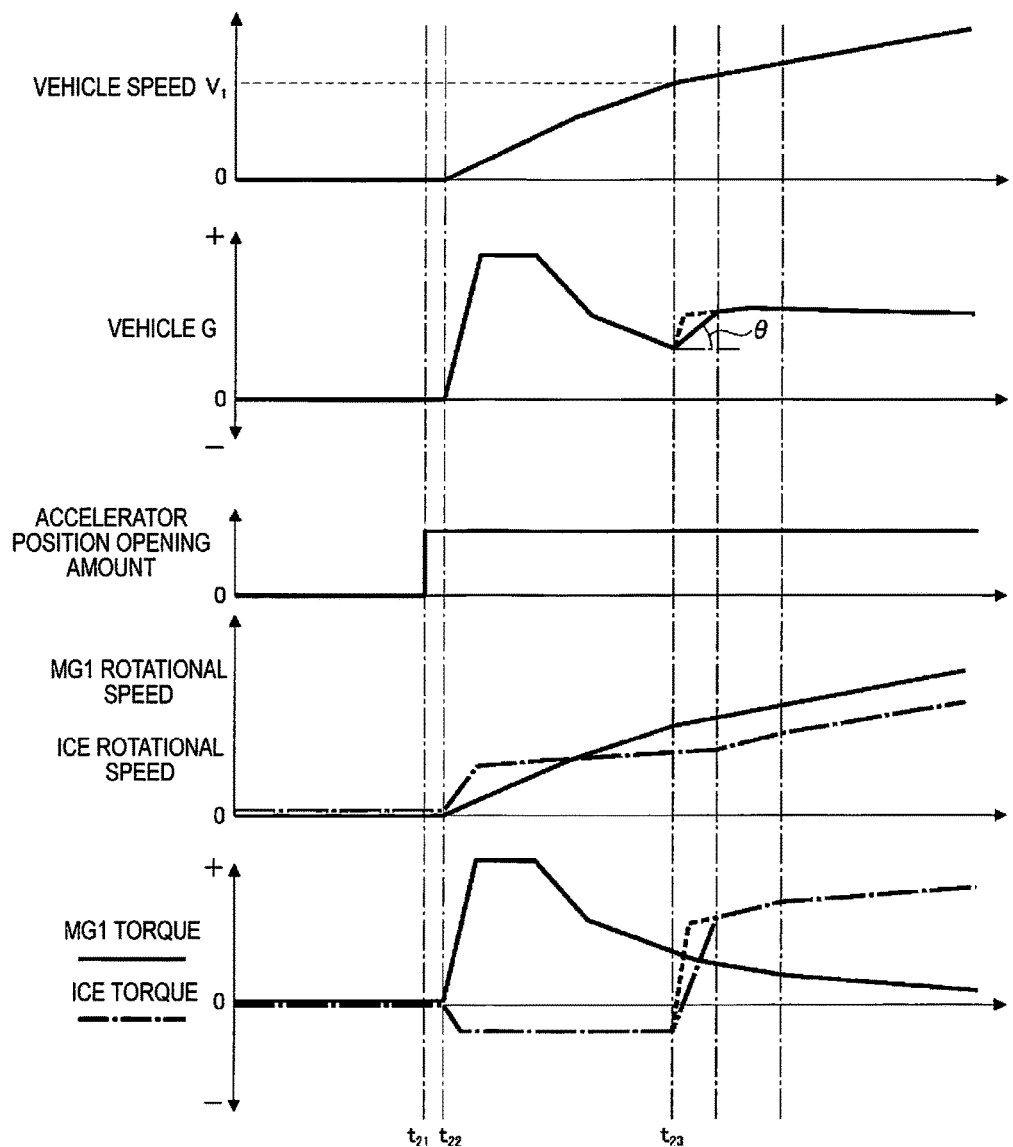
FIG. 14 is a time chart illustrating each of the characteristics of the vehicle speed/vehicle G/accelerator position opening amount/MG1 rotational speed/ICE rotational speed/MG1 torque/ICE torque, when the mode transitions from EV→HEV accompanying a change in the vehicle speed at the time of low SOC, in the first embodiment.

FIG. 14 is a time chart illustrating each of the characteristics of the vehicle speed/vehicle G/accelerator position opening amount/MG1 rotational speed/ICE rotational speed, when the mode transitions from EV→HEV accompanying a change in the vehicle speed at the time of low SOC, in the first embodiment. The action of limiting the driving force at the time of low SOC will be described below, based on the flowcharts illustrated in FIGS. 5A and 5B and the time chart illustrated in FIG. 14. The "vehicle G," the "MG1 rotational speed," the "ICE rotational speed," the "MG1 torque," and the "ICE torque" are the same as in FIG. 9.

Figure 15:
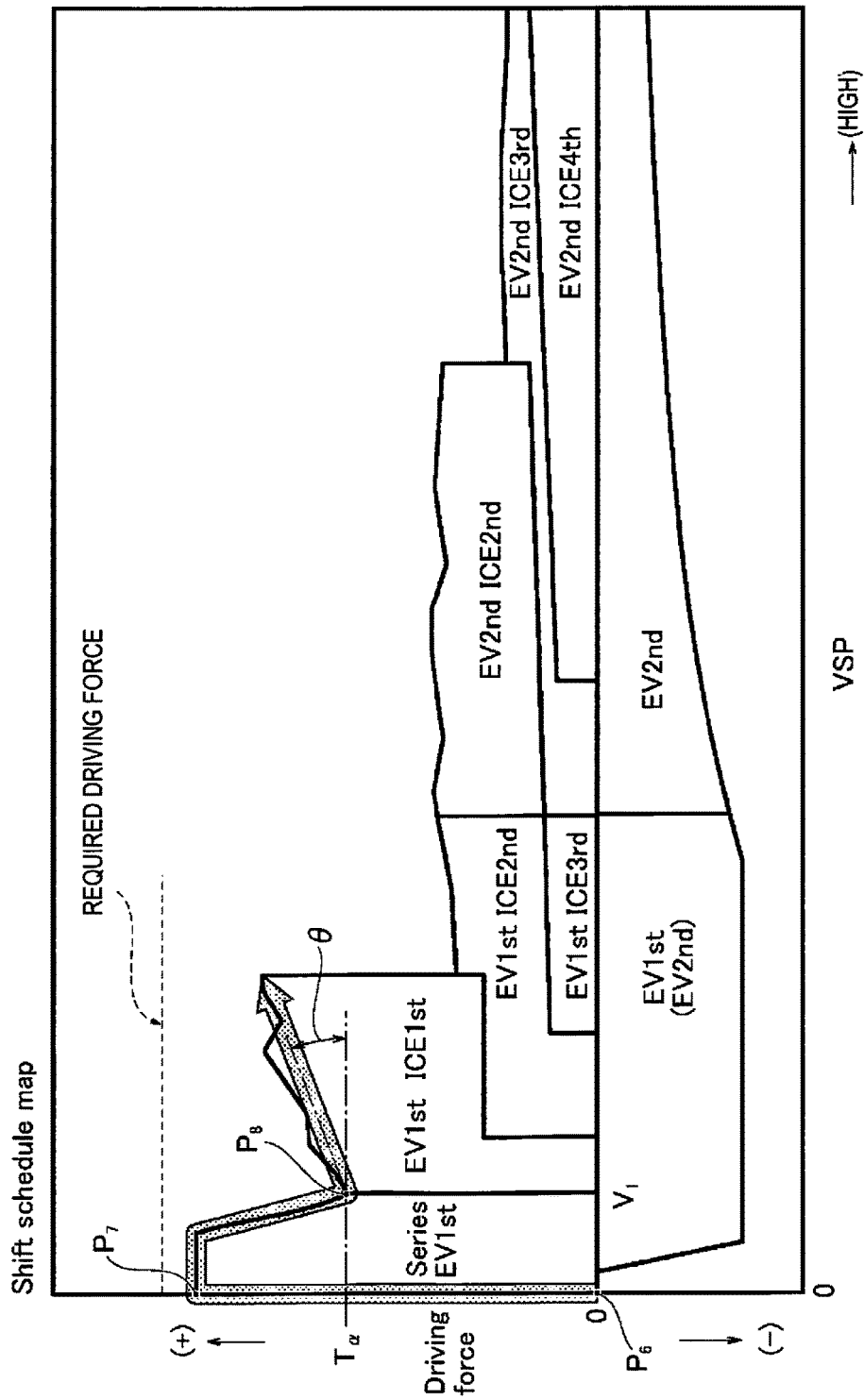
FIG. 15 is an explanatory view illustrating the movement trajectory of the operating point on a shifting map, when the mode transitions from EV→HEV accompanying a change in the vehicle speed at the time of low SOC.

In the hybrid vehicle of the first embodiment, a stopped state in which both the first motor/generator MG1 and the internal combustion engine ICE are stopped, in a state in which the battery SOC is relatively low (less than the SOC threshold value), will be considered. At this time, the process proceeds from Step S1→Step S10 in the flowchart shown in FIG. 5A, and the "shifting map during low SOC" illustrated in FIG. 7 is set as the shifting map. Then, the process proceeds from Step S11→Step S12→Step S13. Before time $t_{21}$ shown in FIG. 14, the accelerator position opening amount and the vehicle speed are both zero. Accordingly, the operating point exists at position $P_6$ on the shifting map, as illustrated in FIG. 15, and the first, second, and third engagement clutches C1, C2, C3 are all set to "Neutral" in the multistage gear transmission 1. In addition, since the operating point does not move, a mode transition request from the EV mode to the HEV mode is not output, and the flow of Step S11→Step S12→Step S13 is repeated.

When the accelerator pedal is depressed at time $t_{21}$, the accelerator position opening amount is increased. At this time, the required driving force of the driver reflected in the accelerator position opening amount shall be the magnitude indicated by the broken line in FIG. 15.

Figure 16A:
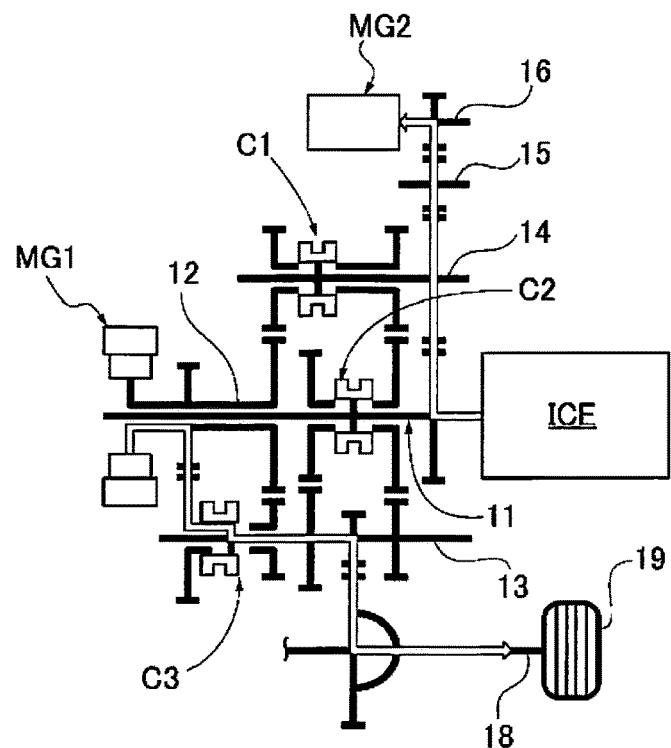
FIG. 16A is an explanatory view illustrating the power transmission route in the EV mode at the time of low SOC.

Then, as the accelerator pedal is depressed and a required driving force of the driver is generated, the operating point on the shifting map moves from position $P_6$ to position $P_7$. As a result, the gear shift stage of the multistage gear transmission 1 is set to "Series EV1st (series EV mode in "EV1st ICe-")" and the third engagement clutch C3 is set to "Left." Then, the first motor/generator MG1 is driven and the internal combustion engine ICE is driven by the second motor/generator MG2, to generate power in the second motor/generator MG2. As a result, an output torque of the first motor/generator MG1 is generated, and the rotational speed of the first motor/generator MG1 starts to rise from time t22. On the other hand, since the second motor/generator MG2 is caused to generate power, a power generation torque of the internal combustion engine ICE is generated, and the rotational speed of the internal combustion engine ICE increases. Accordingly, acceleration acts on the vehicle body to generate a vehicle G, and the vehicle speed starts to rise. Here, the magnitude of the vehicle G is proportional to the MG1 torque. On the other hand, the value of the vehicle speed is proportional to the MG1 rotational speed. In addition, the drive power transmission path at this time is connected from the first motor/generator MG1→second shaft 12→third engagement clutch C3→third shaft 13→drive shaft 18→drive wheels 19, as illustrated in FIG. 16A. That is, only the MG1 torque from the first motor/generator MG1 will be transmitted to the drive wheels 19. Since power is generated in the second motor/generator MG2, the power generation torque that is output from the internal combustion engine ICE is transmitted from the internal combustion engine ICE→first shaft 11→fourth shaft 14→fifth shaft 15→sixth shaft 16→second motor/generator MG2.

Then, when the vehicle speed increases, the operating point on the shifting map illustrated in FIG. 15 will also move, accompanying this increase in the vehicle speed. At this time, the accelerator position opening amount is maintained at a constant value, and the required driving force of the driver also maintains the value indicated by the broken line. Accordingly, since the maximum outputable driving force is lower than the required driving force, the operating point will move from position $P_7$ to the right side on the line segment indicating the maximum outputable driving force, in accordance with the rise of the vehicle speed, as illustrated by the arrow in FIG. 15.

Figure 16B:
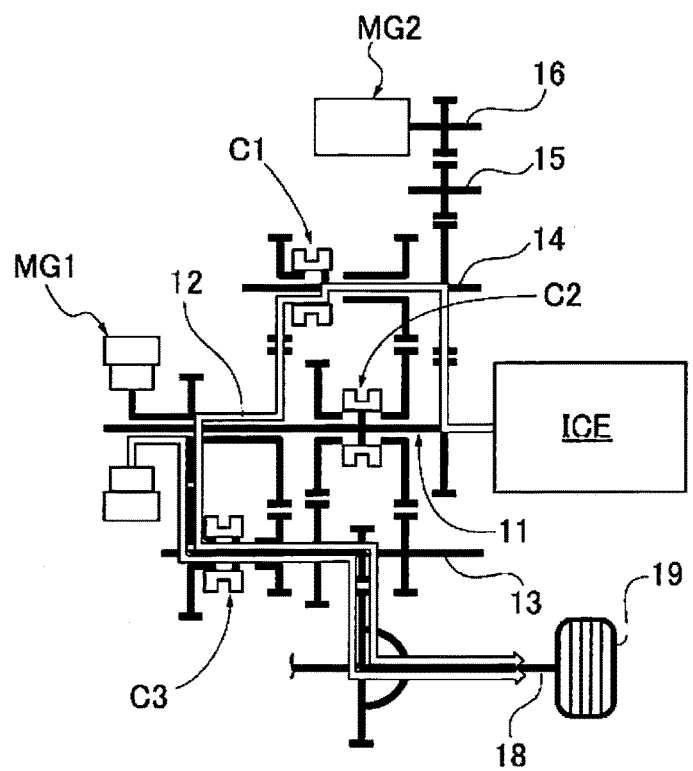
FIG. 16B is an explanatory view illustrating the power transmission route in the HEV mode at the time of low SOC.

When the vehicle speed exceeds $V_1$ at time $t_{23}$, the operating point, which has moved to position $P_8$ on the shifting map, moves from the selection region of "Series EV1st" to the selection region of "EV1st ICE1st." As a result, a mode transition request from the EV mode to the HEV mode is output. That is, the gear shift stage of the multistage gear transmission 1 is set to "EV1st ICE1st," the first engagement clutch C1 is set to "Left," and the output torque of the internal combustion engine ICE is transmitted to the drive wheels 19. In addition, the drive power transmission path at this time becomes a path that is connected from the first motor/generator MG1→second shaft 12→third engagement clutch C3→third shaft 13→drive shaft 18→drive wheels 19, and a path that is connected from the internal combustion engine ICE→first shaft 11→fourth shaft 14→first engagement clutch C1→second shaft 12→third engagement clutch C3→third shaft 13→drive shaft 18→drive wheels 19, as illustrated in FIG. 16B. That is, the MG1 torque from the first motor/generator MG1 and the ICE torque from the internal combustion engine ICE will be transmitted to the drive wheels 19.

On the other hand, in the flowcharts illustrated in FIGS. 5A and 5B, the process proceeds from Step S13→Step S14, and it is determined whether or not the mode transition request at time $t_{23}$ is a request accompanying a change in the vehicle speed. Here, the accelerator position opening amount is maintaining a constant value from time $t_{21}$. In addition, the vehicle speed is continuing to rise from time $t_{21}$. That is, this mode transition request at time $t_{23}$ is a request accompanying a change in the vehicle speed. Therefore, the process proceeds from Step S14→Step S15→Step S16, and the increase gradient θ of the driving force in the HEV mode is set based on the read battery SOC and the map illustrated in FIG. 8B.

Then, the process proceeds to Step S17, and the maximum value of the driving force in the HEV mode (EV1st ICE1 st) is set to a value that changes (increases) from the maximum outputable driving force in the EV mode (Series EV1st) at the time of a mode transition with the increase gradient θ, in accordance with the increase in the vehicle speed. As a result, although the vehicle G increases from time t23, the increase gradient thereof is set to θ, as illustrated in FIG. 14. Accordingly, compared to a case in which the maximum value of the driving force in the HEV mode is not limited (shown by the broken line in FIG. 14), an increase in the vehicle G is suppressed, and it is possible to suppress fluctuation in the vehicle G at the time of a mode transition from the EV mode to the HEV mode.

That is, the operating point that enters the selection region of "EV1st ICE1st" from position P8 moves from the maximum outputable driving force in the EV mode at the time of a mode transition ("Tα" in FIG. 15) to the right side on the line segment indicated by the arrow in FIG. 15. Accordingly, it is possible to suppress an increase in the driving force at the time of a mode transition and to suppress fluctuation in the vehicle G.

Figure 8B:
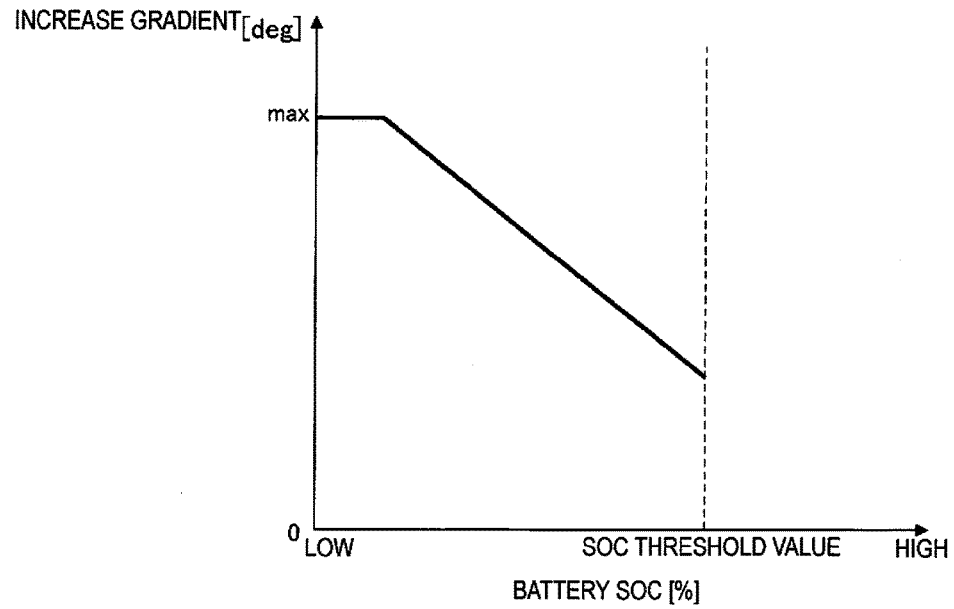
FIG. 8B is a gradient setting map for setting the increase gradient of the maximum value of the driving force in the HEV mode at the time of low SOC.

Furthermore, this increase gradient θ is set according to the battery SOC, and the increase gradient θ is set to a higher value as the battery SOC is decreased (refer to FIG. 8B). That is, the suppression amount of the maximum value of the driving force in the HEV mode becomes smaller as the battery SOC is decreased. Here, to suppress the driving force in the HEV mode, the output torque of the internal combustion engine ICE (ICE torque) is controlled to suppress this ICE torque with respect to the maximum outputable torque indicated by the broken line, as illustrated in FIG. 14. Accordingly, the ICE torque becomes greater as the battery SOC is decreased, and it is possible to suppress consumption of the high-power battery 3.

Next, the effects are described. The effects listed below can be obtained by the driving force control device for a hybrid vehicle according to the first embodiment.

(1) In a hybrid vehicle capable of mode transition between an EV mode in which only an electric motor (first motor/generator MG1) is used as a traveling drive source and an HEV mode in which the electric motor (first motor/generator MG1) and an internal combustion engine ICE are used as traveling drive sources, and that does not have a differential rotation absorbing element in the drive system, comprising a driving force control unit (hybrid control module 21) that controls the driving force to the drive wheels 19 in accordance with a required driving force within a range of a maximum outputable driving force of the traveling drive source, and the driving force control unit (hybrid control module 21) limits the driving force transmitted to the drive wheels 19 in the HEV mode in accordance with the maximum outputable driving force in the EV mode at a time of then mode transition when the mode transitions from the EV mode to the HEV mode while a change in the vehicle speed is occurring. Accordingly, in a hybrid vehicle that does not have a differential rotation absorbing element, it is possible to make the mode transition shock that occurs when the mode transitions from the EV mode to the HEV mode less likely to be experienced, even when the driver's sensitivity to shock is high.

(2) The driving force control unit (hybrid control module 21) does not limit the driving force transmitted to the drive wheels 19 in the HEV mode with respect to the maximum outputable driving force in the HEV mode when the mode transitions from the EV mode to the HEV mode while a change in a required driving force by the driver is occurring. Accordingly, in addition to the effect of (1), it is possible to achieve an increase in the driving force that is transmitted to the drive wheels 19 at the time of an increase in the required driving force of the driver, and to promptly respond to the required driving force of the driver.

(3) When limiting the driving force transmitted to the drive wheels 19 in the HEV mode, the driving force control unit (hybrid control module 21) sets an increase gradient θ of the driving force transmitted to the drive wheels 19 in the HEV mode to a larger value as a remaining charging amount (battery SOC) of a battery (high-power battery 3) that supplies electric power to the electric motor (first motor/generator MG1) becomes lower. Accordingly, in addition to the effect of (1) or (2), the ICE torque is increased when the battery SOC is low, and it is possible to suppress consumption of the high-power battery 3.

Second Embodiment

The second embodiment is an example in which the maximum outputable driving force in the EV mode is lower than the peak value, at the time of a mode transition from the EV mode to the HEV mode, in the "shifting map during high SOC."

Figure 17:
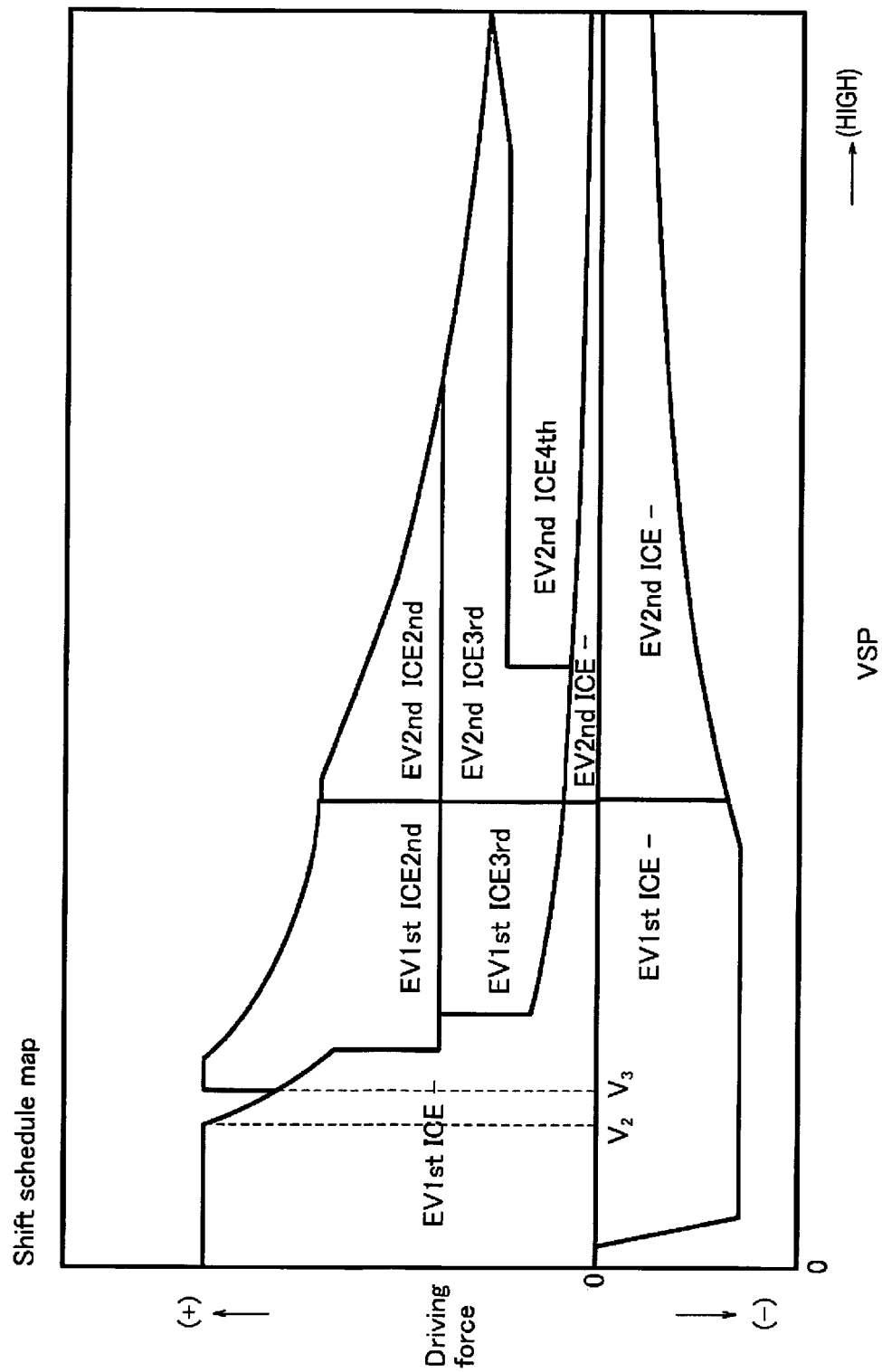
FIG. 17 is one example of a shifting map used at the time of high SOC in the second embodiment.

In the second embodiment, the shifting map illustrated in FIG. 17 is used as the "shifting map during high SOC" that is set when the battery SOC is relatively high. In this "shifting map during high SOC" illustrated in FIG. 17, the assignment of each selection region is the same as in the "shifting map during high SOC" in the first embodiment (refer to FIG. 6), but the magnitude of the maximum outputable driving force in "EV1st ICE-," which is the EV mode, is different.

That is, in the "shifting map during high SOC" of the first embodiment, the maximum outputable driving force is a constant value from vehicle speed zero to vehicle speed $V_0$, at which the mode transitions to the HEV mode, as illustrated in FIG. 6. In contrast, in the "shifting map during high SOC" of the second embodiment illustrated in FIG. 17, while the maximum outputable driving force is a constant value from vehicle speed zero to vehicle speed $V_2$, the maximum outputable driving force is gradually decreased accompanying an increase in the vehicle speed from vehicle speed $V_2$.

Then, at vehicle speed $V_3$ at which the mode transitions to the HEV mode, the maximum outputable driving force in the EV mode is lower than the peak value. In addition, in the HEV mode (EV1st ICE2nd), the maximum outputable driving force is greatly increased, as the output torque of the internal combustion engine ICE is added.

Figure 18:
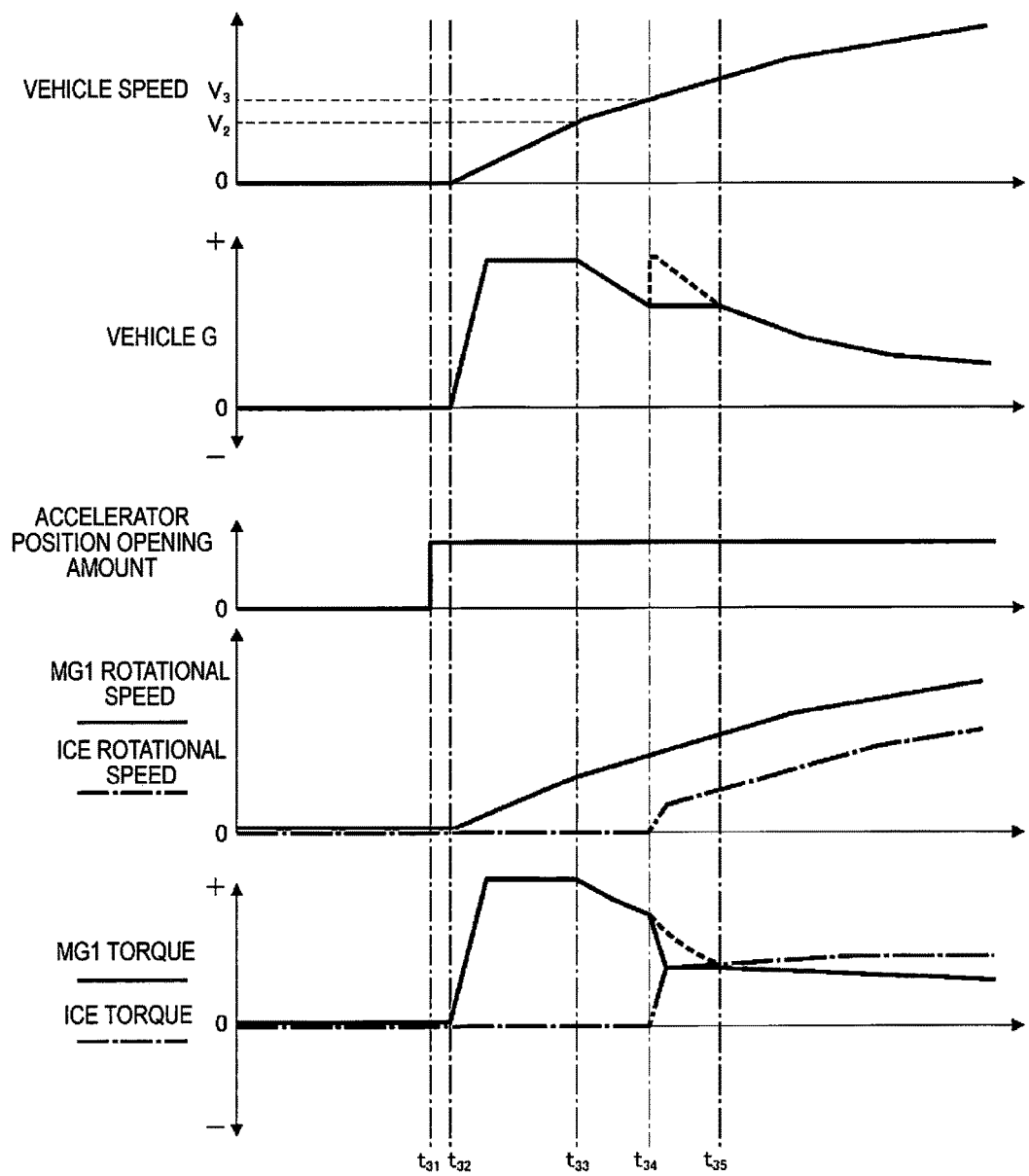
FIG. 18 is a time chart illustrating each of the characteristics of the vehicle speed/vehicle G/accelerator position opening amount/MG1 rotational speed/ICE rotational speed/MG1 torque/ICE torque, when the mode transitions from EV→HEV accompanying a change in the vehicle speed at the time of high SOC, in the second embodiment.

The "action of limiting the driving force at the time of high SOC" when using such a "shifting map during high SOC" will be described. FIG. 18 is a time chart illustrating each of the characteristics of the vehicle speed/vehicle G/accelerator position opening amount/MG1 rotational speed/ICE rotational speed, when the mode transitions from EV→HEV accompanying a change in the vehicle speed at the time of high SOC, in the second embodiment. The action of limiting the driving force at the time of high SOC in the second embodiment will be described below, based on the time chart illustrated in FIG. 18. The "vehicle G," the "MG1 rotational speed," the "ICE rotational speed," the "MG1 torque," and the "ICE torque" are the same as in FIG. 9.

In the hybrid vehicle of the second embodiment, when both the first motor/generator MG1 and the internal combustion engine ICE are stopped, in a state in which the battery SOC is relatively high (equal to or greater than the SOC threshold value), the accelerator pedal is depressed and the accelerator position opening amount is increased at time $t_{31}$ as shown in FIG. 18. At this time, the required driving force of the driver reflected in the accelerator position opening amount shall be the magnitude indicated by the broken line in FIG. 19.

Then, as the accelerator pedal is depressed and a required driving force of the driver is generated, the operating point on the shifting map moves from position $P_9$ to position $P_{10}$. As a result, the gear shift stage of the multistage gear transmission 1 is set to "EV1st ICE-" and the first motor/generator MG1 is driven. As a result, an output torque of the first motor/generator MG1 is generated, and the rotational speed of the first motor/generator MG1 starts to rise from time $t_{32}$. Accordingly, acceleration acts on the vehicle body to generate a vehicle G, and the vehicle speed starts to rise.

Figure 19:
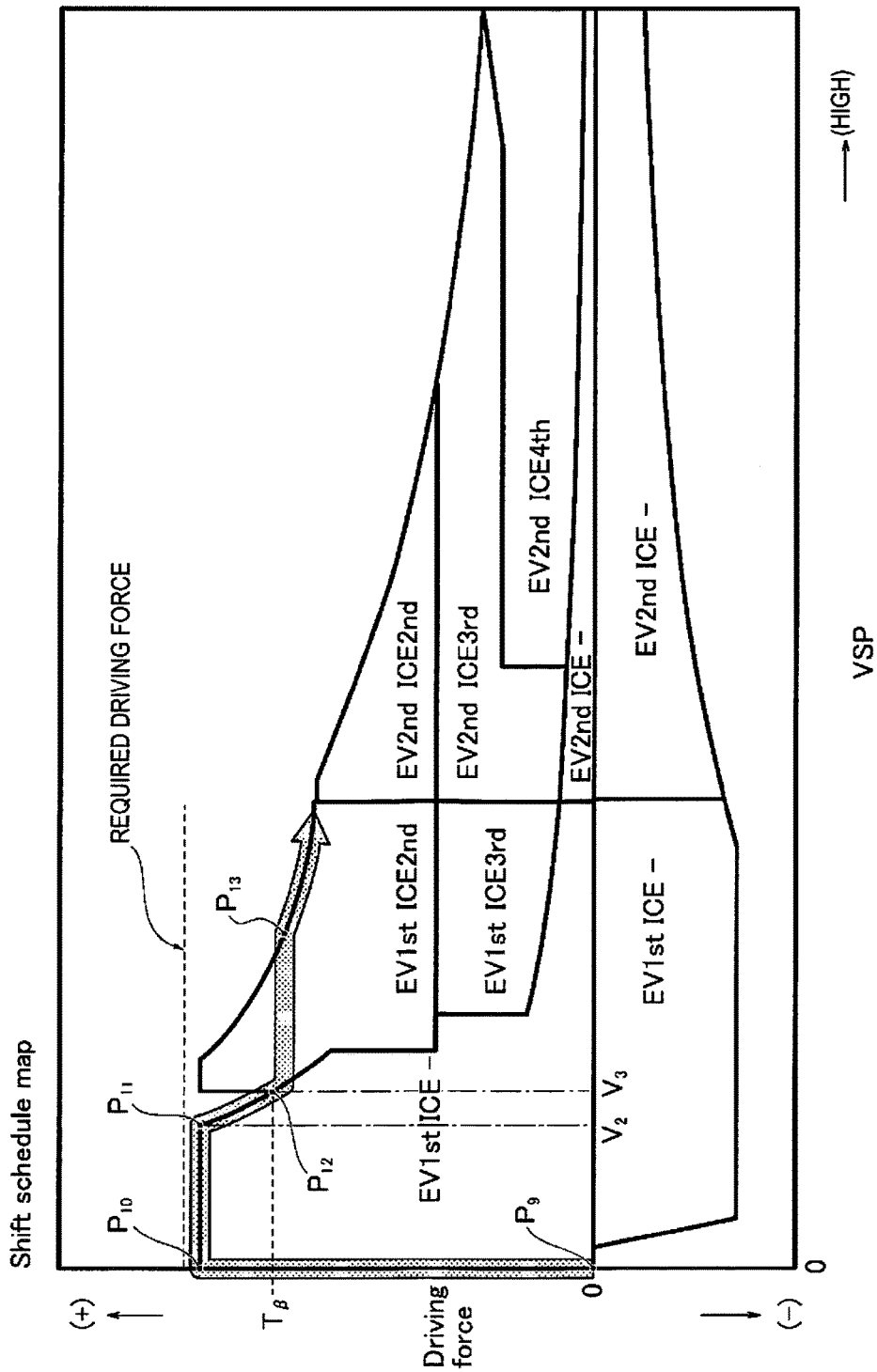
FIG. 19 is an explanatory view illustrating the movement trajectory of the operating point on a shifting map, when the mode transitions from EV→HEV accompanying a change in the vehicle speed at the time of high SOC.

Thereafter, the operating point on the shifting map illustrated in FIG. 19 also moves, accompanying an increase in the vehicle speed. At this time, the accelerator position opening amount is maintained at a constant value, and the required driving force of the driver also maintains the value indicated by the broken line. Accordingly, the operating point will move from position $P_{10}$ to the right side on the line segment indicating the maximum outputable driving force, in accordance with the increase in the vehicle speed, as illustrated by the arrow in FIG. 19.

Then, when the vehicle speed reaches $V_2$ at time $t_{33}$, the maximum outputable driving force decreases accompanying the increase in the vehicle speed. That is, the operating point moves from position $P_{11}$ to position $P_{12}$ on the shifting map. In addition, the MG1 torque is gradually reduced, and the vehicle G is also reduced.

When the vehicle speed exceeds $V_3$ at time $t_{34}$, the operating point, which has moved to position $P_{12}$ on the shifting map illustrated in FIG. 19, moves from the selection region of "EV1st ICE-" to the selection region of "EV1st ICE2nd." As a result, a mode transition request from the EV mode to the HEV mode is output. That is, the gear shift stage of the multistage gear transmission 1 is set to "EV1st ICE2nd" and internal combustion engine ICE is started.

Then, while the required driving force at this time is constant, the vehicle speed continues to increase. Therefore, the mode transition request at time $t_{34}$ is assumed to be accompanying a change in the vehicle speed, and the maximum value of the driving force in the HEV mode is set to a value that is equivalent to the maximum outputable driving force in the EV mode (EV1st ICE-) at the time of a mode transition. That is, the maximum outputable driving force in the EV mode (EV1st ICE-) decreases from time $t_{33}$ and becomes $T_β$ at time 134. Accordingly, the maximum value of the driving force in the HEV mode is set to "$T_β$," which is lower than the peak of the maximum outputable driving force in the EV mode.

As a result, the driving force that is transmitted to the drive wheels 19 is limited to "$T_β$" even if the required driving force is high, and the operating point that enters the selection region of "EV1st ICE2nd" on the shifting map illustrated in FIG. 19 will move from position 12 on the line segment indicated by the arrow accompanying the increase in the vehicle speed.

That is, when the internal combustion engine ICE is started and ICE torque is generated, the MG1 torque is reduced by the same magnitude as the generated ICE torque in the first motor/generator MG1, to suppress an increase in the vehicle G, as illustrated in FIG. 18. It is thereby possible to suppress fluctuation in the vehicle G at the time of a mode transition from the EV mode to the HEV mode. Then, it is possible to make the mode transition shock less likely to be felt, even if the mode transition is accompanying a change in the vehicle speed, and the driver's sensitivity to shock is high. That is, it is possible to carry out a mode transition without imparting discomfort to the driver.

In the event the MG1 torque is not reduced at the time of a mode transition from the EV mode to the HEV mode without limiting the maximum value of the driving force in the HEV mode, the vehicle G, which is the driving force that is transmitted to the drive wheels 19, will suddenly increase by the amount of the ICE torque, at the time $t_{34}$ of the mode transition, as illustrated by the broken line in FIG. 18. Consequently, the driver will experience a mode transition shock even though the driver has not depressed the accelerator pedal, and will experience discomfort.

Thereafter, the maximum outputable driving force in the HEV mode decreases accompanying the increase in the vehicle speed, and the maximum outputable driving force in the HEV mode becomes equal to or less than the maximum outputable driving force in the EV mode (EV1st ICE-) at the time of a mode transition. That is, the operating point moves to position P13 on the shifting map illustrated in FIG. 19. Accordingly, the maximum value of the driving force in the HEV mode is set to the maximum outputable driving force in the HEV mode. That is, after time t35, the operating point will move from position P13 to the right side on the line segment indicating the maximum outputable driving force, accompanying the increase in the vehicle speed, as illustrated by the arrow in FIG. 19. It is thereby possible to end the suppression control of the MG1 torque, while suppressing large fluctuations in the vehicle G, which is the driving force that is transmitted to the drive wheels 19.

That is, when the maximum outputable driving force in the EV mode at the time of a mode transition from the EV mode to the HEV mode is lower than the peak value, as in this second embodiment, the maximum value of the driving force in the HEV mode is limited in accordance with this reduced maximum outputable driving force. Accordingly, it is possible to suppress a change (increase) in the vehicle G, which is the driving force transmitted to the drive wheels 19, even if ICE torque is added to the MG1 torque due to a mode transition to the HEV mode, and to suppress discomfort even if the driver's sensitivity to shock is high.

In addition, while the maximum value of the driving force transmitted to the drive wheels 19 is controlled by suppressing the MG1 torque by the amount of the ICE torque that is added, the limitation of the maximum value of the driving force in the HEV mode is continued until the maximum outputable driving force in the HEV mode becomes equal to or less than the maximum outputable driving force in the EV mode (EV1st ICE-) at the time of a mode transition. Therefore, it is possible to end the suppression control of the MG1 torque, while suppressing large fluctuations in the vehicle G, which is the driving force that is transmitted to the drive wheels 19.

The effects listed below can be obtained by the driving force control device for a hybrid vehicle according to the second embodiment.

(4) When limiting the driving force transmitted to the drive wheels 19 in the HEV mode, the driving force control unit (hybrid control module 21) limits the maximum value of the driving force transmitted to the drive wheels 19 in the HEV mode to a value equivalent to the maximum outputable driving force in the EV mode at the time of a mode transition, until the maximum outputable driving force in the HEV mode becomes a value equivalent to the maximum outputable driving force in the EV mode at the time of a mode transition. Accordingly, it is possible to end the suppression control of the MG1 torque, while suppressing large fluctuations in the vehicle G, which is the driving force that is transmitted to the drive wheels 19.

The driving force control device for a hybrid vehicle of the present invention was described above based on the first embodiment and the second embodiment, but specific configurations thereof are not limited to these embodiments, and various modifications and additions to the design can be made without departing from the scope of the invention according to each claim in the claims.

Figure 20:
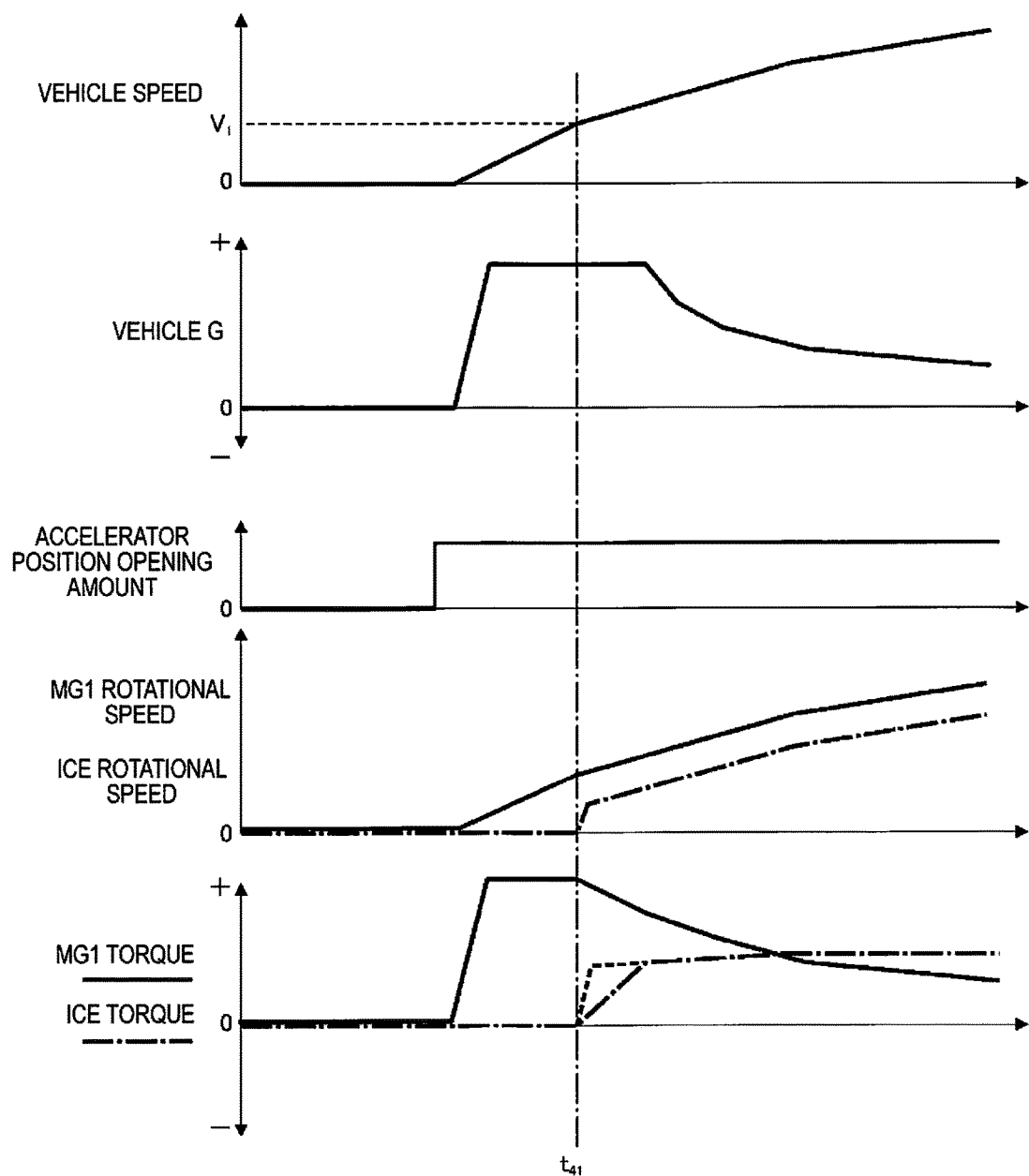
FIG. 20 is a time chart illustrating each of the characteristics of the vehicle speed/vehicle G/accelerator position opening amount/MG1 rotational speed/ICE rotational speed/MG1 torque/ICE torque, in the event the ICE torque is limited when the mode transitions from EV→HEV accompanying a change in the vehicle speed at the time of high SOC, in the first embodiment.
Figure 21:
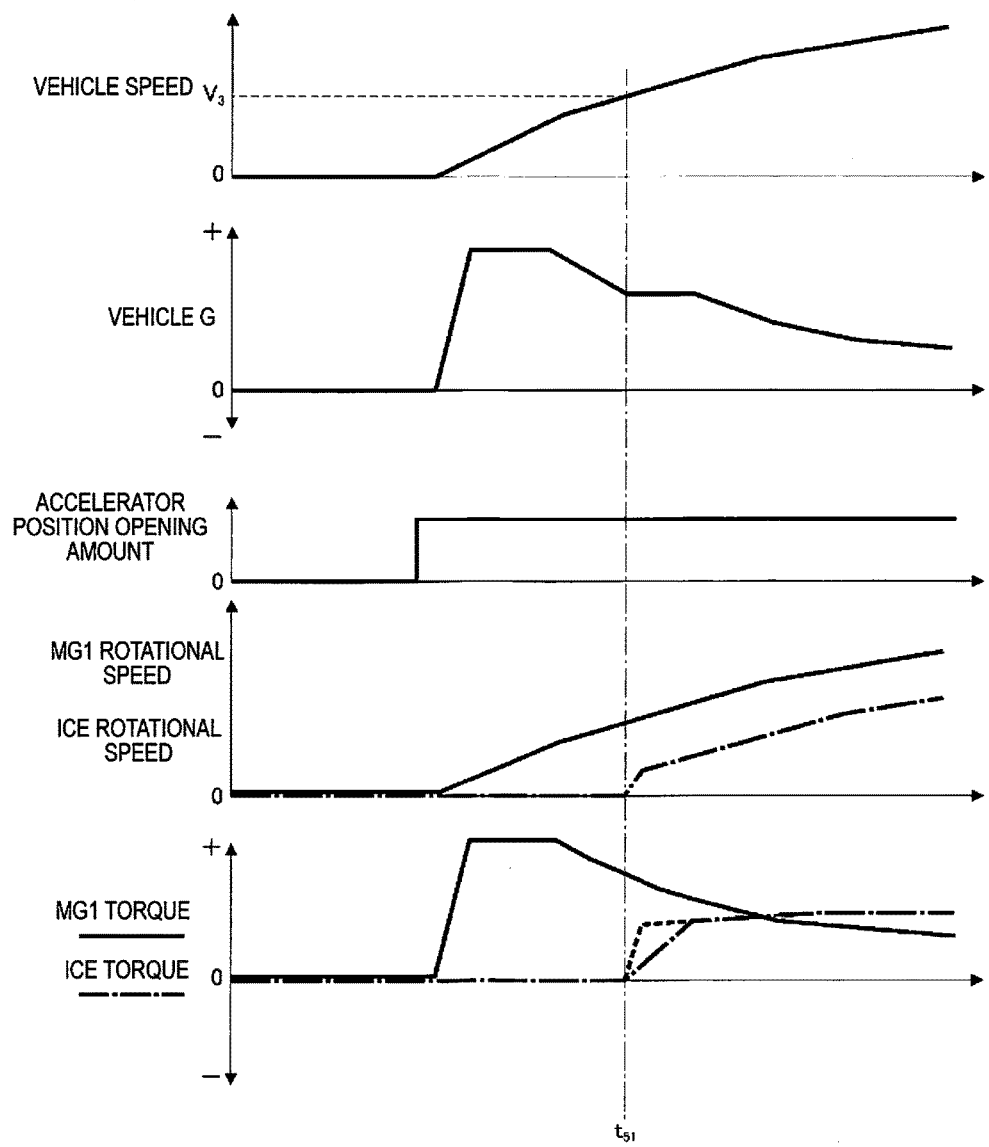
FIG. 21 is a time chart illustrating each of the characteristics of the vehicle speed/vehicle G/accelerator position opening amount/MG1 rotational speed/ICE rotational speed/MG1 torque/ICE torque, in the event the ICE torque is limited when the mode transitions from EV→HEV accompanying a change in the vehicle speed at the time of high SOC, in the second embodiment.

In the first embodiment and the second embodiment, an example was shown in which the MG1 torque, which is the output torque of the first motor/generator MG1, is reduced by the amount of the ICE torque, when limiting the driving force transmitted to the drive wheels 19 in the HEV mode, but the invention is not limited thereto. In the case of using the "shifting map during high SOC" of the first embodiment (refer to FIG. 6), when the mode changes from the EV mode to the HEV mode accompanying a change in the vehicle speed at time t41, the ICE torque, which is the output torque of the internal combustion engine ICE, is suppressed more than when a maximum output is carried out (illustrated by the broken line), as illustrated in FIG. 20. In addition, in the case of using the "shifting map during high SOC" of the second embodiment (refer to FIG. 17), when the mode changes from the EV mode to the HEV mode accompanying a change in the vehicle speed at time t51, the ICE torque, which is the output torque of the internal combustion engine ICE, is suppressed more than when a maximum output is carried out (illustrated by the broken line), as illustrated in FIG. 20. In this manner, the ICE torque may be suppressed when suppressing a change (increase) in the vehicle G, which indicates the driving force transmitted to the drive wheels 19.

Additionally, when suppressing a change (increase) in the vehicle G, which indicates the driving force transmitted to the drive wheels 19, the change (increase) in the vehicle G, which indicates the driving force transmitted to the drive wheels 19, may be suppressed by controlling (suppressing) both the MG1 torque and the ICE torque.

Furthermore, in the first and second embodiments, an example was shown in which the driving force control device of the present invention is applied to a hybrid vehicle comprising, as drive system components, one internal combustion engine (engine), two motor/generators, and a multistage gear transmission having three engagement clutches. However, the driving force control device of the present invention may be applied to, for example, a hybrid vehicle equipped with one engine and one motor.

The invention claimed is:

1. A driving force control device for a hybrid vehicle capable of mode transition between an EV mode in which only an electric motor is used as a traveling drive source and an HEV mode in which the electric motor and an internal combustion engine are used as traveling drive sources, and that has neither a torque converter nor a friction clutch in the drive system, comprising:

a driving force control unit configured to control a driving force to a drive wheel in accordance with a required driving force within a range of a maximum outputable driving force of the electric motor in the EV mode or the electric motor and the internal combustion engine in the HEV mode, the driving force control unit being configured such that, when a mode transition from the EV mode to the HEV mode occurs while a change in a vehicle speed is occurring and the maximum outputable driving force in the EV mode is lower than the required driving force, the driving force control unit limits the driving force transmitted to the drive wheel in the HEV mode in accordance with the maximum outputable driving force in the EV mode at a time of the mode transition and continues the limitation of the driving force for a period of time after the time of the mode transition.

2. The driving force control device according to claim 1, wherein
the driving force control unit does not limit the driving force transmitted to the drive wheel in the HEV mode with respect to the maximum outputable driving force in the HEV mode when the mode transitions from the EV mode to the HEV mode while a change in the required driving force by the driver is occurring.

3. The driving force control device according to claim 1, wherein
when limiting the driving force transmitted to the drive wheel in the HEV mode, the driving force control unit limits the maximum value of the driving force transmitted to the drive wheel in the HEV mode to a value equivalent to the maximum outputable driving force in the EV mode at the time of the mode transition, until the maximum outputable driving force in the HEV mode becomes a value equivalent to the maximum outputable driving force in the EV mode at the time of the mode transition.

4. The driving force control device according to claim 1, wherein
the driving force control unit is configured to continue the limitation of the driving force until the maximum outputable driving force in the HEV mode becomes equal to or smaller than the maximum outputable driving force in the EV mode at the time of the mode transition.

5. A driving force control device for a hybrid vehicle capable of mode transition between an EV mode in which only an electric motor is used as a traveling drive source and an HEV mode in which the electric motor and an internal combustion engine are used as traveling drive sources, and that has neither a torque converter nor a friction clutch in the drive system, comprising:
a driving force control unit configured to control a driving force to a drive wheel in accordance with a required driving force within a range of a maximum outputable driving force of the electric motor in the EV mode or the electric motor and the internal combustion engine in the HEV mode,
the driving force control unit being configured to limit the driving force transmitted to the drive wheel in the HEV mode to in accordance with the maximum outputable driving force in the EV mode at a time of the mode transition when the mode transitions from the EV mode to the HEV mode while a change in a vehicle speed is occurring, and
when limiting the driving force transmitted to the drive wheel in the HEV mode, the driving force control unit sets an increase gradient of the driving force transmitted to the drive wheel in the HEV mode to increase as a remaining charging amount of a battery that supplies electric power to the electric motor decreases.

6. A driving force control device for a hybrid vehicle capable of mode transition between an EV mode in which only an electric motor is used as a traveling drive source and an HEV mode in which the electric motor and an internal combustion engine are used as traveling drive sources, and that has neither a torque converter nor a friction clutch in the drive system, comprising:
a driving force control unit configured to control a driving force to a drive wheel in accordance with a required driving force within a range of a maximum outputable driving force of the electric motor in the EV mode or the electric motor and the internal combustion engine in the HEV mode,
the driving force control unit being configured to limit the driving force transmitted to the drive wheel in the HEV mode in accordance with the maximum outputable driving force in the EV mode at a time of the mode transition when the mode transitions from the EV mode to the HEV mode while a change in a vehicle speed is occurring,
when limiting the driving force transmitted to the drive wheel in the HEV mode, the driving force control unit sets an increase gradient of the driving force transmitted to the drive wheel in the HEV mode to increase as a remaining charging amount of a battery that supplies electric power to the electric motor decreases, and
the driving force control unit being further configured not to limit the driving force transmitted to the drive wheel in the HEV mode with respect to the maximum outputable driving force in the HEV mode when the mode transitions from the EV mode to the HEV mode while a change in the required driving force by the driver is occurring.

* * * * *